(12) United States Patent
Minami et al.

(10) Patent No.: US 6,407,751 B1
(45) Date of Patent: Jun. 18, 2002

(54) METHOD AND APPARATUS OF GENERATING MOBILE OBJECTS AND STORAGE MEDIUM STORING AN OBJECT GENERATING MOBILE OBJECTS

(75) Inventors: Kazuhiro Minami; Toshihiro Suzuki, both of Yokohama (JP)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/238,216

(22) Filed: Jan. 27, 1999

(30) Foreign Application Priority Data

Jan. 28, 1998 (JP) .......................... 10-015817

(51) Int. Cl.[7] ................... G09G 5/00; G10L 11/00
(52) U.S. Cl. ................ 345/736; 345/734; 345/737; 345/854; 704/202
(58) Field of Search .................. 345/701, 702, 345/704, 736, 737, 778, 854, 855, 734; 704/202, 238–244

(56) References Cited

U.S. PATENT DOCUMENTS

| | | | | |
|---|---|---|---|---|
| 5,289,574 A | * | 2/1994 | Sawyer et al. ............. | 395/157 |
| 5,751,965 A | * | 5/1998 | Mayo et al. ................. | 345/224 |
| 5,821,937 A | * | 10/1998 | Tonelli et al. ............... | 345/356 |
| 5,864,782 A | * | 1/1999 | Mederer et al. ............. | 702/182 |
| 5,999,179 A | * | 12/1999 | Kekic et al. ................. | 345/349 |
| 6,005,579 A | * | 12/1999 | Sugiyama et al. ........... | 345/855 |
| 6,061,056 A | * | 2/2000 | Menard et al. .............. | 345/999 |
| 6,061,517 A | * | 5/2000 | House et al. ................ | 345/999 |
| 6,282,582 B1 | * | 8/2001 | Oshima et al. .............. | 709/317 |

\* cited by examiner

*Primary Examiner*—Kristine L. Kincaid
*Assistant Examiner*—Thomas J Joseph
(74) *Attorney, Agent, or Firm*—David M. Shofi; Anne Vachon Dougherty

(57) ABSTRACT

This invention provides various GUI moderator templates symbolizing templates which are capable of classifying a complicated behavior of the mobile agent into basic behavior patterns and defining a desired behavior pattern of the mobile agent by a combination of the basic behavior patterns, and various GUI activities symbolizing an activity of issuing a request in each place where the mobile agent moves around. The operator drops the GUI moderator template and the GUI activity on the GUI builder to join them for defining the order of executing jobs. The user Can also set address information of a place of execution in the GUI activity.

5 Claims, 30 Drawing Sheets

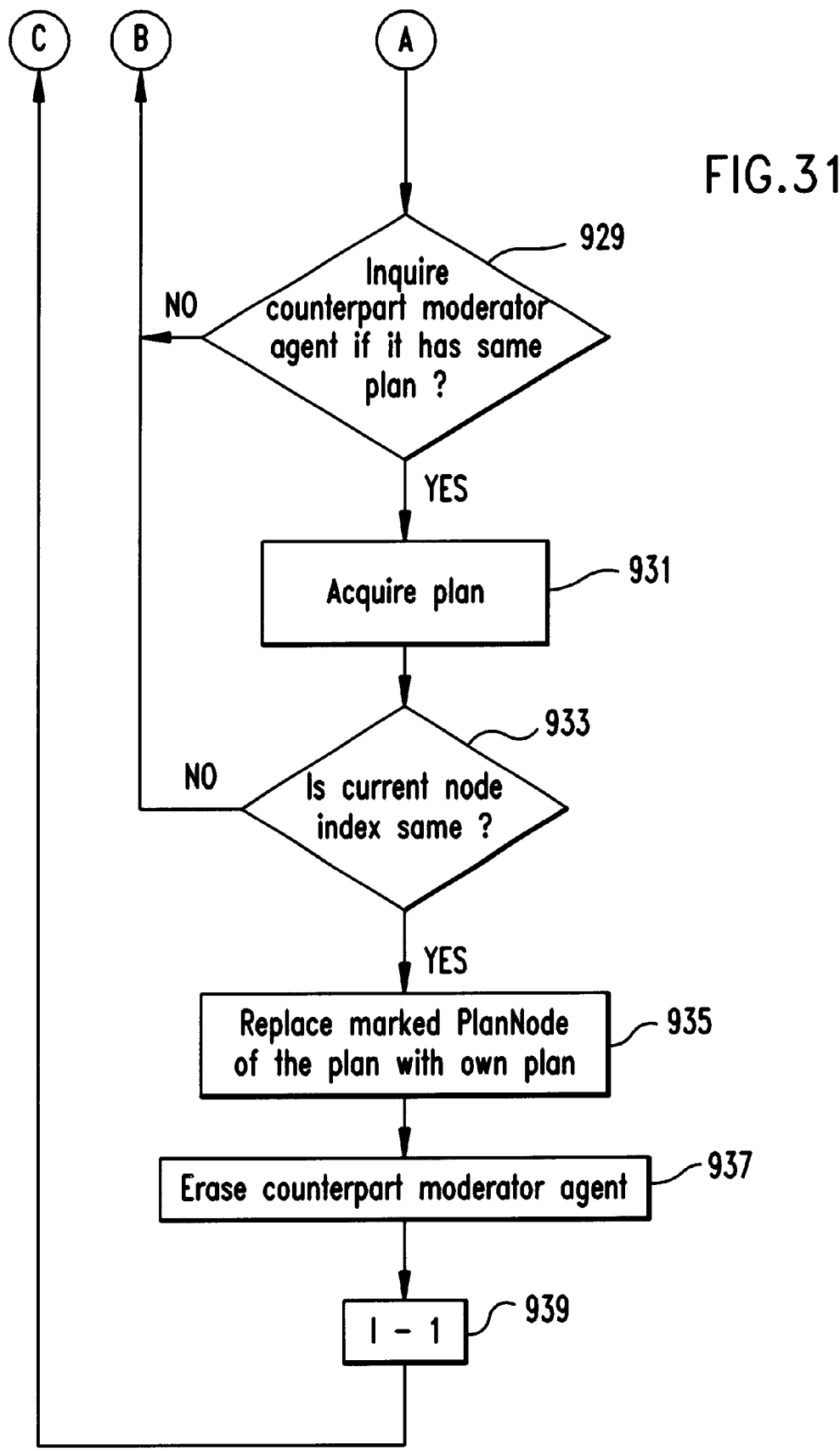

METHOD AND APPARATUS OF GENERATING MOBILE OBJECTS AND STORAGE MEDIUM STORING AN OBJECT GENERATING MOBILE OBJECTS

FIELD OF THE INVENTION

This invention relates to a technology of generating a mobile agent which moves to a remote server existing on a network and forms an instruction in said remote server in a distributed computer environment; and, more particularly, to a technology of generating a mobile agent on a GUI builder in an environment in which an executing address, executing sequence, etc. are visibly apprehensible.

BACKGROUND OF THE INVENTION

The prior art includes mobile agent technology in which a mobile agent moves to a server on a network and causes an instruction to be executed at the server (See, e.g., U.S. Pat. No. 5,603,031, and "Latest Internet Technology" by Fumihiko Nishida and Susumu Fujiwara, Nikkei Communication Separate Volume, Nikkei BP, pp 104–117). Such a mobile agent consists of two basic elements, a "mobile agent" component and a "place" component. The mobile agent is capable of moving from place to place existing on a network while holding its own internal condition and is capable of contacting another agent (a mobile agent or a non-mobile agent) in the place to which it has moved to obtain a necessary service. The "place" is the location to which a mobile agent has moved and which is provided by a server existing on a network to support a contact between agents and to absorb any differences between hardwares and platforms.

Such mobile agent technology enables a mobile agent to do a job which was so far done manually, such as dynamically adjusting a schedule of an internal conference depending on the schedule of employees or reservation status of a conference room, and acquiring desired information which is distributed on the network, etc.

However, because it is indispensable to define an executing address of an executed job in the property, and such requires knowledge of an object oriented programming, it is desired to have a GUI builder which enables a user to easily generate a mobile agent in a manner similar to the development supporting tool provided by Workflow Automation ("Workflow Automation" is a trademark of Ultimus LLC, information is available on the world wide web at ultimus1.com).

Further, there exists the technology for automatically classifying a complicated behavior of the mobile agent into basic behavior patterns, for providing a template (moderator template) defining a desired behavior pattern of the mobile agent by a combination of the basic behavior patterns, and for controlling the issuance of a request in each place where the mobile agent moves around as a predecessor (activity working in a previous place) and a successor (activity working in a next place), as seen in Japanese patent application No. 9-92091 filed on Apr. 10, 1997, though not published at the time of filing this application.

However, because split/merge of a mobile agent is possible in various places, such that preparation of a plan in generating a mobile agent is further complicated when this technology is used, a GUI builder which allows a user to easily generate a mobile agent is especially desired.

It is, therefore, an objective of this invention to enable a mobile agent to be developed without requiring a high degree of programming knowledge.

It is another objective of this invention to reduce the labor and the time of developing a mobile agent as far as possible.

It is a further objective of this invention to provide a user friendly environment for developing a mobile agent which allows a developer to intuitively grasp the functions thereof.

SUMMARY OF THE INVENTION

This invention allows a mobile agent to specify an executing address and an executing sequence for a job on a visibly apprehensible GUI builder. Provided on the GUI builder are various GUI moderator templates depicting templates (moderator templates) for classifying complicated behavior of the mobile agent into basic behavior patterns and for defining a desired overall behavior pattern of the mobile agent by a combination of the basic behavior patterns, along with various GUI activities for depicting the activity of issuing a request in each place to which the mobile agent moves. The operator can define the executing sequence of a job by dropping the GUI moderator template and the GUI activity on the GUI builder and joining them together. The operator can also set address information for the place where each job is to be executed in the GUI activity. Mobile agents (execution codes) are generated from the GUI moderator template and the GUI activity which have been defined by the operator.

In one mode of this invention, a method is provided for generating at least a part of mobile objects which execute different activities in different places under the control of a mobile moderator agent in a mobile agent generating apparatus which is provided with a pointing device and a display screen, said method comprising;

(a) a step of generating a first GUI activity symbolizing a first activity to display on said display, (b) a step of generating a second GUI activity symbolizing a second activity to display on said display, (c) a step of generating a GUI moderator template symbolizing a moderator template defining the connection relationship between said first activity and said second activity to display said GUI template on said display, (d) a step of holding a first order information specifying the order of said GUI moderator template and said first GUI activity in response to an operator input for correlating said GUI moderator template to said first GUI activity, (e) a step of holding a second order information specifying the order of said GUI moderator template and said second GUI activity in response to an operator input for correlating said GUI moderator template to said second GUI activity, (f) a step of displaying an entry for inputting first address information of a first place where said first activity is run, (g) a step of holding said first address information in correlation to said first GUI activity, (h) a step of displaying an entry for inputting a second address information of a second place where said second activity is run, (i) a step of holding said second address information in correlation to said second GUI activity, and (j) a step of generating at least a part of mobile objects from said first order information, said second order information, said first address information, and said second address information.

In another mode of this invention, a mobile objects generating apparatus, provided with a pointing device and a display screen, is provided for generating at least a part of mobile objects which run different activities in different places under the control of a mobile moderator agent, said apparatus comprising;

(a) GUI activity symbolizing an activity and provided with a display method to display the activity on said display screen, (b) a GUI template symbolizing an activity and a moderator template defining a connection relationship with another activity and provided with a display method to display the template on said display screen, (c) an input event acquiring part for acquiring an operator input which correlates said GUI moderator template to said GUI activity, (d) a plan object operating part for specifying the order of said GUI moderator template and said GUI activity in response to said operator input, (e) a GUI place object provided with a display method for displaying an entry to input address information of a place where said activity is to run and a setAddress method for holding the address information of the place inputted in said entry, and (f) a run code generating part for generating at least a part of mobile objects based on said order information and the address information of said place.

In still another mode of this invention, a storage medium is provided for storing GUI objects generating at least a part of mobile objects which run different activities in different places under the control of a mobile moderator agent in a mobile agent generating apparatus which is provided with a pointing device and a display screen, said medium storing;

(a) a GUI activity provided with:
  a display method displaying an activity on said display screen in a manner in which it is recognized, and
  a predecessor list controlling the connection relationship with other GUI objects, (b) a GUI place object provided with:
  a display method for displaying an entry to input address information specifying a place where said activity is to be run on said display screen, and
  a setAddress method for holding an inputted address information, and (c) a GUI moderator template provided with:
  a display method for displaying a moderator template defining a connection relationship between an activity and other activities on said display screen in a manner they are recognized, and
  a GUI moderator template provided with a predecessor list for controlling the connection relationship with other objects.

In still another mode of this invention, a storage medium is provided for storing GUI objects generating at least a part of mobile objects which run different activities in different places under the control of a mobile moderator agent in a mobile agent generating apparatus which is provided with a pointing device and a display screen, said medium storing;

(a) a GUI activity provided with:
  a display method displaying an activity on said display screen in a manner in which it is recognized, and
  a predecessor list controlling the connection relationship with other GUI objects, and (b) a GUI place object provided with:
  a display method for displaying an entry to input address information specifying a place where said activity is to be run on said display screen, and a GUI place object provided with a setAddress method for holding inputted address information.

BRIEF DESCRIPTION OF THE DRAWINGS

These and other objectives are realized by the present invention wherein;

FIG. 31 is a flow chart showing a procedure for processing the ANDJoin template in the destination in the preferred embodiment of this invention;

DESCRIPTION OF THE PREFERRED EMBODIMENT

Figure 1:
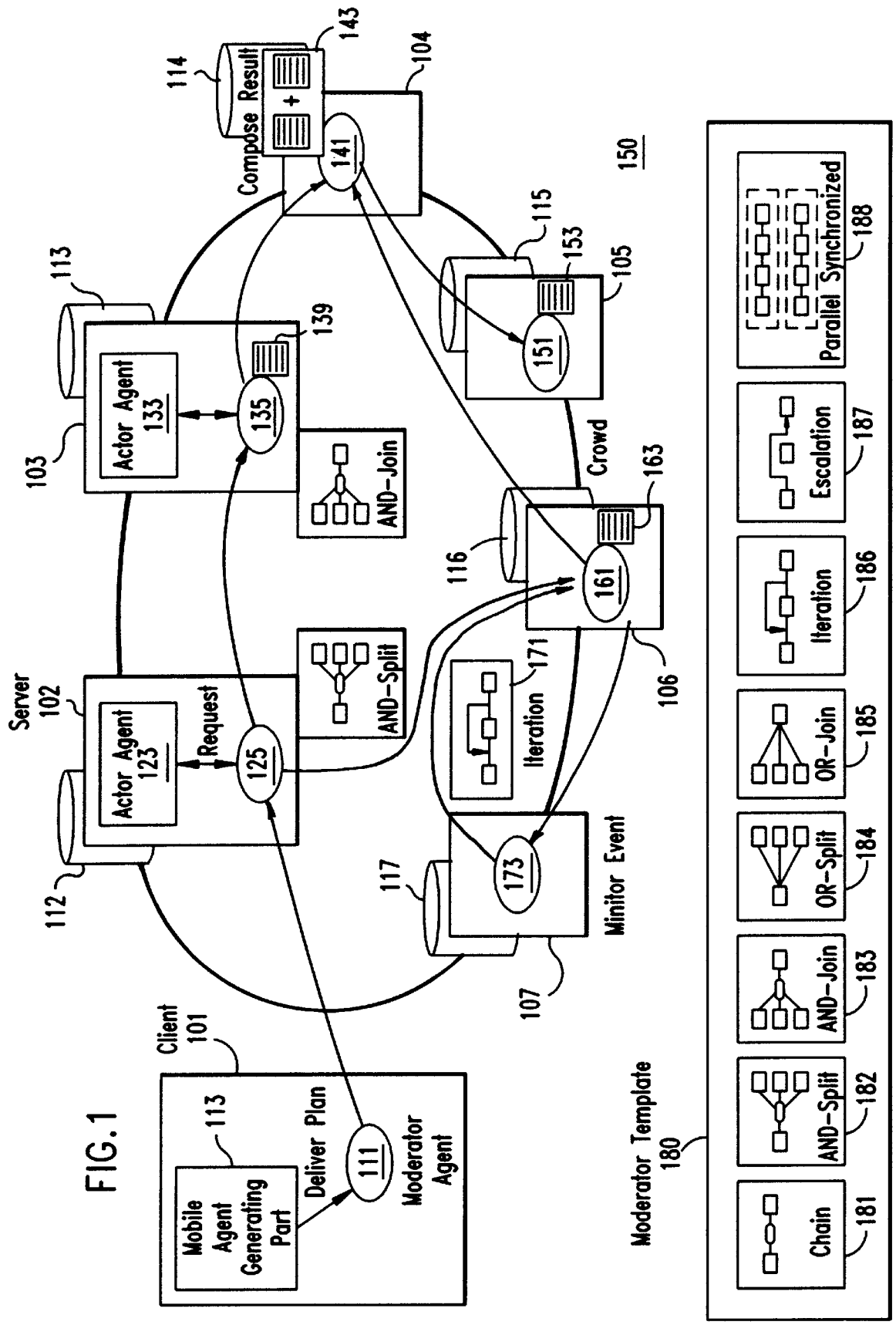
FIG. 1 is a diagram showing a distributed network environment in which a mobile agent generated by this invention operates.

Referring to FIG. 1, a distributed network environment 150 for running a mobile object generated according to this invention is shown. Each server 112 to 117 is provided with a place 102 to 107 which is capable of providing a service to the mobile agents 125, 135, 141, etc. Collectively, the places in this distributed network environment are called a "crowd".

A mobile agent generating part 113, for generating a mobile agent, delivers a generated plan to a moderator agent 111 which in turn executes the plan to move around to specified places. The mobile agents, 125, 135, 141, 151, 161 and 173, can contact other agents existing in each place 102 to 107 (an agent contacting a mobile agent to provide a service is specifically called an "actor agent"), send out requests, and receive the result of requests. The place supports a contact between agents. The mobile agent 125, etc., can also hold the result of the request received from the actor agent as "Result" 139, 143, 153, 163 and continue to move. It can also apply various treatments to the Result including composition and split, etc., during movement.

Figure 2:
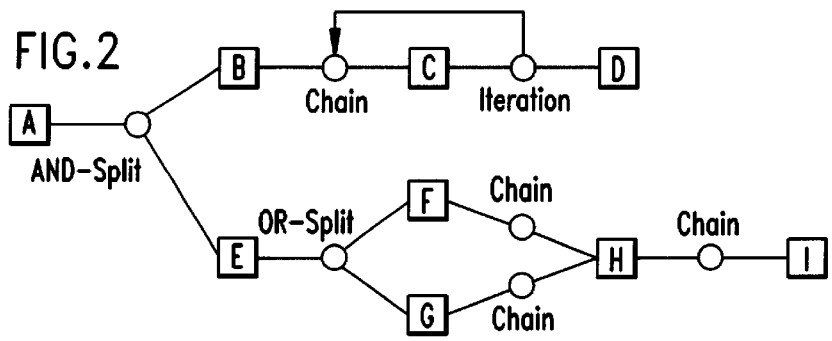
FIG. 2 is a diagram showing an example of a mode in which a mobile agent generated by this invention moves on the distributed network.

In this invention, movement, split and extinction of a mobile agent are controlled by moderator templates 181 to 187. The user can simply define a complicated job, including split and merge, as shown in FIG. 2 by combining various templates depending on the mode of processing.

B. Hardware Configuration

Figure 3:
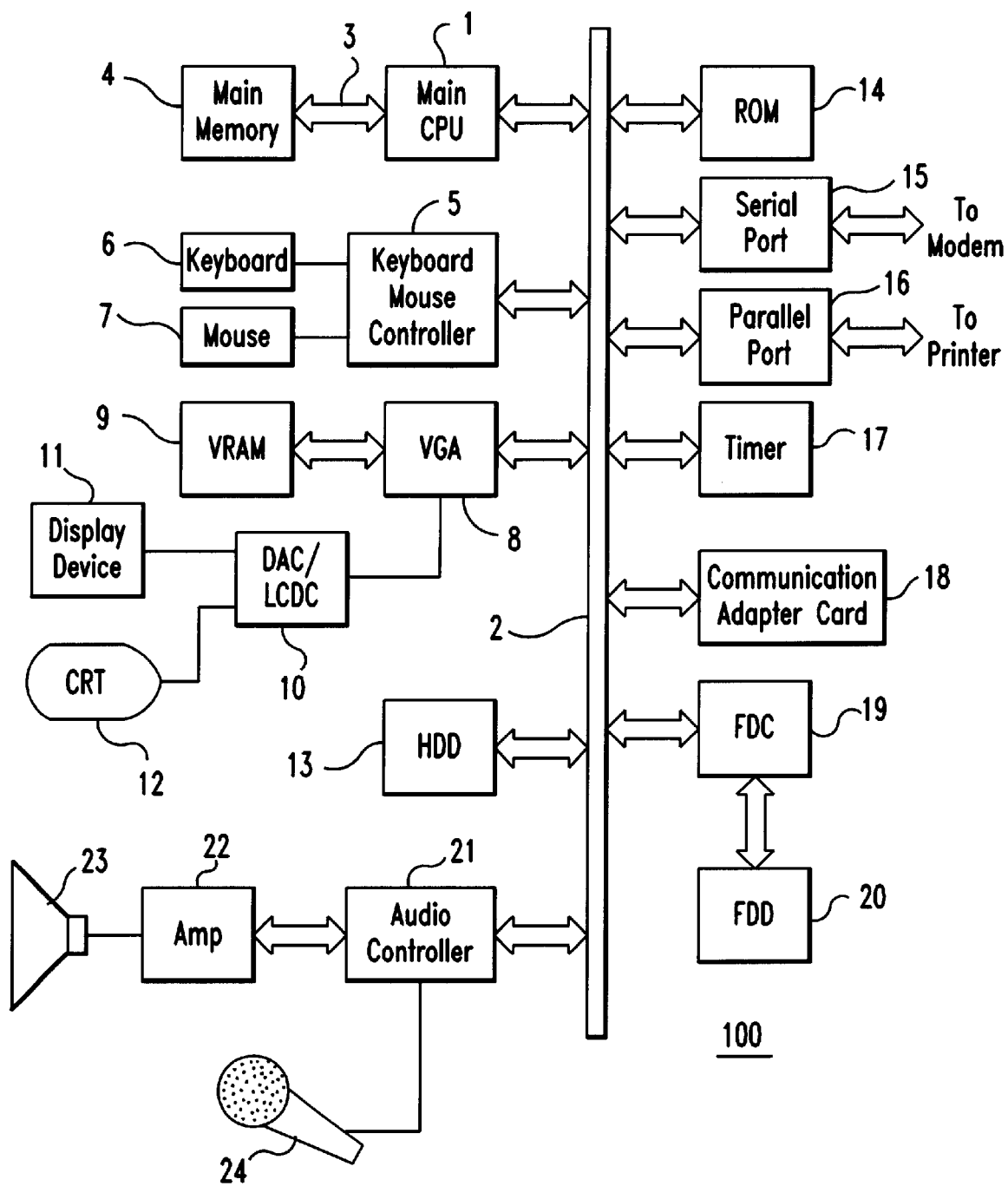
FIG. 3 is a schematic diagram of the hardware configuration of the mobile agent generating system in the preferred embodiment of this invention.

FIG. 3 schematically shows a hardware configuration of the mobile agent generating system in the preferred embodiment of this invention. The mobile agent generating system comprises a central processing unit (CPU) 1 and a memory 4. The CPU 1 and the memory 4 are connected to a hard disk device 13, as an auxiliary storage via a bus 2, etc. A floppy disk device (or a medium drive device such as MO, CD-ROM 14), 20, is connected to the bus 2 through a floppy disk controller (or any controller such as an IDE controller, a SCSI controller) 19.

A floppy disk (or a medium such as MO, CD-ROM, etc.) is inserted to the floppy disk device 20 (or a medium drive device). A computer program code which gives instructions to the CPU and the like in cooperation with an operating system to practice this invention is recorded in the floppy disk, the hard disk device 13, and the ROM 14 and executed by being loaded in the memory 4. The computer program code may be compressed or divided into pieces for recording in a plurality of media.

Further, the mobile agent generating system 100 may be a system provided with a user interface hardware and, as a user interface hardware, a pointing device 7 ( a mouse, a joystick, and a track ball, etc.) for inputting screen position information, a keyboard 6 supporting key input and a display 11, 12 for presenting image data to the user. A speaker 23 receives an audio signal from an audio controller 21 via an amplifier 22 for output as a voice.

A GUI plan node library (to be described later) which is an input to the mobile agent generating system 100 of this invention is stored in the hard disk and is inputted to the database retrieval system 100 via SCSI interface. It is also possible to communicate with other computer via a serial port 15 and a modem or a communication adapter 18 such as a token ring for accessing to data of the other system or to a database existing in a recording medium such as the floppy disk.

As such, it will be readily understood that this invention may be practiced by a conventional personal computer (PC), a workstation, a computer implemented in home electric appliances such as a television set and a facsimile equipment, or a combination thereof. It should be noted, however, that these components are given for exemplary purpose and it is not meant that all of these components are the indispensable components of this invention. Particularly, because this invention is directed to a database retrieval, components such as the serial port 15, the communication adapter card 18, the audio controller 21, the amplifier 22 and the speaker 23 are not indispensable in one mode of this invention. Similarly, while an operating system which supports as a standard a GUI multi-window environment such as Windows (trademark of Microsoft), OS/2 (trademark of IBM) and X-WINDOW system (trademark of MIT) on AIX (trademark of IBM) is preferable, the operating system is not limited to any specific operating system environment.

While FIG. 3 shows a system in a stand alone environment, this invention may be implemented in a client/server system in which a client machine is LAN-connected to a server machine via Ethernet and a token ring, etc. and the server machine side is provided with an internal data generating part, an internal data holding part, an internal data retrieval part, and an external data source to be described later with the rest of functions disposed in the client side. As such, it is a matter of discretion in the design to dispose what function in which of the server machine side and the client machine side. Various modifications of a combination of a plurality of machines and distribution of functions to these machines, etc., are within the concept of this invention.

C. System Configuration

Figure 4:
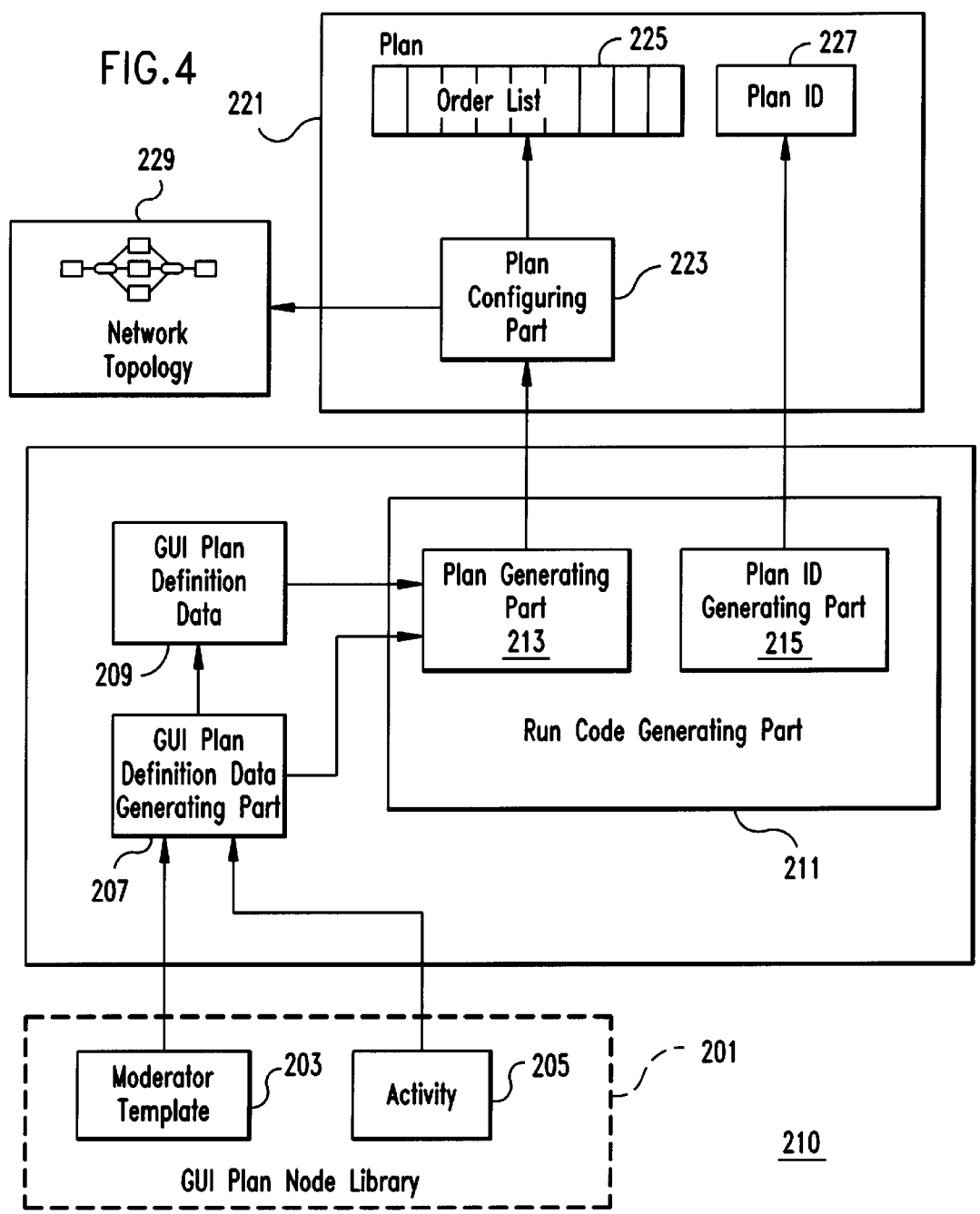
FIG. 4 is a functional block diagram showing an embodiment of processing elements in the mobile agent generating system of this invention.

The system configuration of the mobile agent generating system in the preferred embodiment of this invention is now described with reference to FIG. 4 and FIG. 5. FIG. 4 is a functional block diagram showing an embodiment of a processing element in the mobile agent generating system 210. A run code generating part 211 comprises a plan generating part 213 and a plan ID generating part 215. The plan ID generating part 215 allocates a plan ID which is unique on the network to a plan. In the preferred embodiment of this invention, the plan ID generating part 215 generates a plan ID 227 by composing a URL of the internet, a port number, an agent ID (allocated to the mobile agent generating part) and a serial Number (the mobile agent generating part allocates each time a plan ID is generated).

The plan generating part 213 generates a moderator agent and a plan based on GUI plan definition data 209. The generated plan includes a plan configuring part 223 controlling a moderator template to be run and activity information, etc., and a order list 225 defining the order of the moderator templates and the activities. The plan configuring part 223 has information correlating the plan node object (a collective name of a moderator template and an activity) and forms a network topology 231. A GUI plan definition data generating part 207 generates GUI plan definition data 209 using information of the GUI plan node library 201 based on an indication by the operator.

Figure 5:
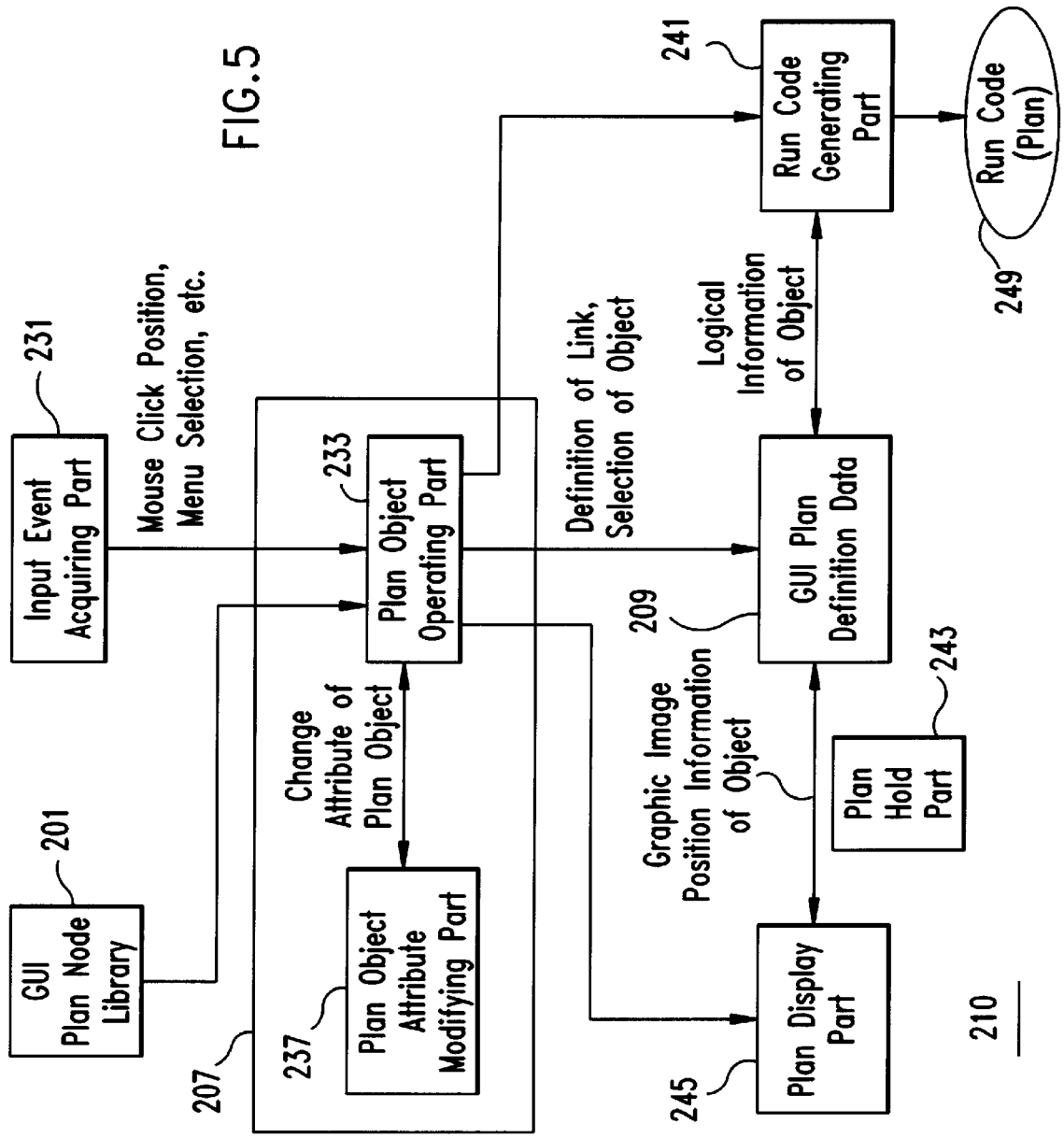
FIG. 5 is a functional block diagram of an embodiment of processing elements in the mobile agent generating system of this invention as seen from the GUI plan definition data generating part 207.

FIG. 5 is a functional block diagram of an embodiment of processing elements in the mobile agent generating part 210 as seen from the GUI plan definition data generating part 207. An input event acquiring part 231 which provides input information to the GUI plan definition data generating part 207 acquires an event such as a key input and a mouse click from the user and converts it to a message which can be interpreted by a plan object operating part 233 of the GUI plan definition data generating part 207 for delivery to the part 233.

The plan object operating part 233 generates an object such as a GUI activity and a GUI template and sets a property of objects. A plan object attribute modifying part 237 provides a dialog window for modifying the property of a specified object. Modified information is reflected to the GUI plan definition data 209 via the plan object operating part 233.

A GUI plan definition data holding part 243 holds an activity constituting a plan, logical information of a template and graphic image information. A plan display part 245 visually displays the structure of a plan on the screen based on the graphic image information of the GUI plan definition data.

A run code generating part 241 generates a run code 249 (plan) for generating a defined plan based on the logical information of the GUI plan definition data.

Figure 6:
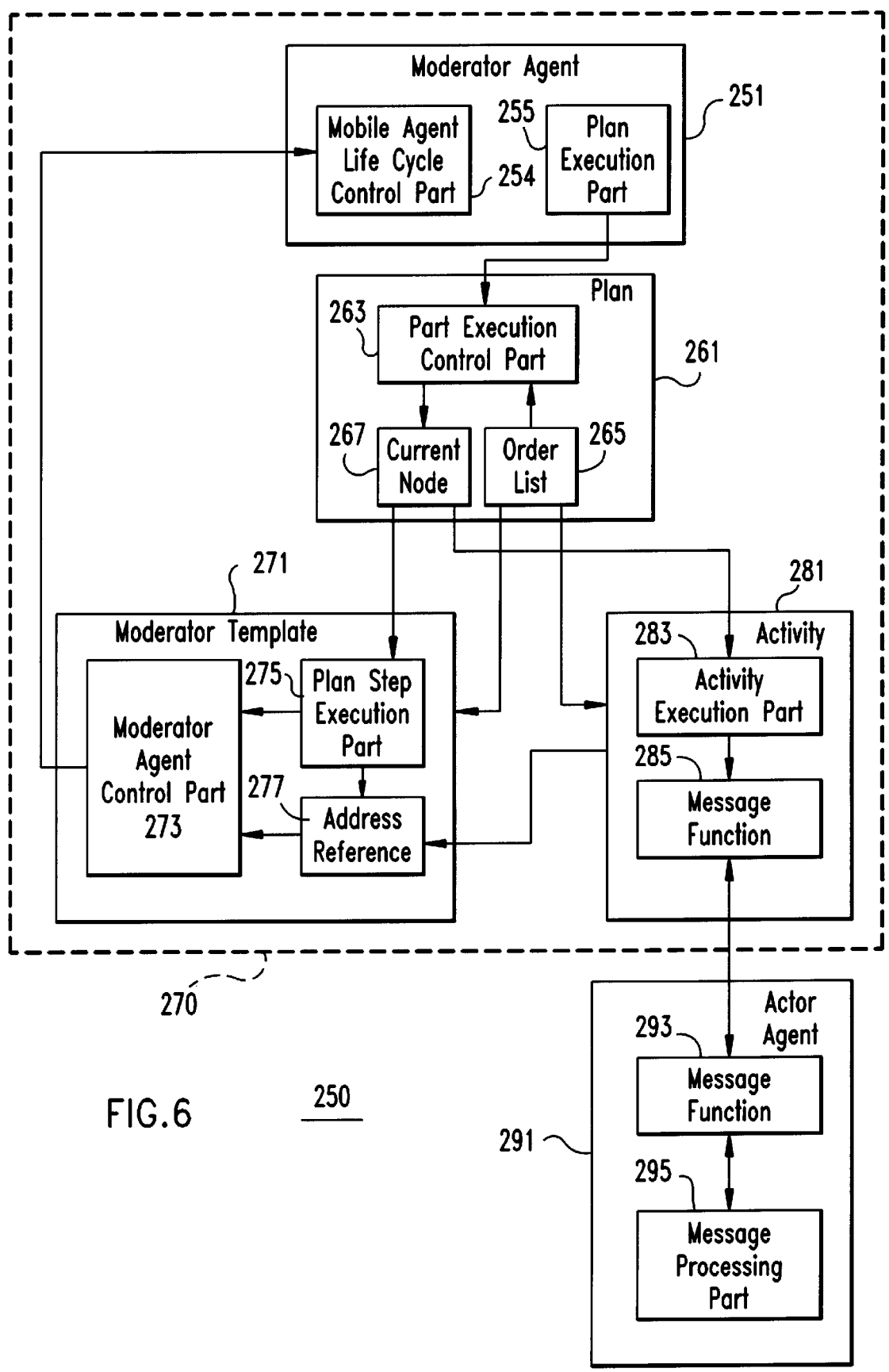
FIG. 6 is a functional block diagram showing an embodiment of processing elements during run time of the mobile agents generated by the mobile agent generating system of this invention.

FIG. 6 is a functional block diagram of an embodiment of a processing element upon running mobile agents 270 which are generated by the mobile agent generating part 210. The mobile agents 270 include a moderator agent 251, a plan object 261, a moderator template 271 and an activity 281. The moderator agent 251 includes a mobile agent life cycle control part 253 and a plan execution part 255. The mobile agent life cycle control part 253 executes movement, duplication and erasure, etc., of the mobile objects 270. The plan execution part 255 recognizes arrival at a new place and instructs a plan object 261 to execute the plan.

The plan object includes a plan execution control part 263, a current node 267 and an order list 265. The plan execution control part 263, upon receiving an instruction from the plan execution part of a moderator agent to execute a plan, determines a plan node object to be currently executed with reference to the current node 267 and the order list 265 and requests the plan node objects (moderator template 271 and activity 281) to execute.

The current node 267 corresponds to a plan node iterator to be described later and monitors which plan node object is currently executed. The order list 265 is a list specifying a plan node object to be executed. When a branch, etc., does not occur, the plan objects request the plan node to execute in the order of the order list 265.

The moderator template 271 includes a moderator agent control part 273, a plan step execution part 275 and an address reference part 277. The moderator agent control part 273 requests the mobile agent life cycle control part 253 of the moderator agent 251 to move, duplicate and erase the mobile object 270. The plan step execution part 275 is differently defined depending on the kinds of the moderator template and controls instructions to be executed in an origin place or a destination place. The address reference part 277 has a role of acquiring an address from an activity and telling the moderator agent control part 273 a destination address.

The activity 281 includes an activity execution part 283 and a message function 285. The activity execution part 283 has a function to store an instruction executed in places where a mobile agent moves around and a Result is received in each place. The message function 285 has a function to exchange a message with the actor agent 291.

The actor agent 291 is another agent existing at a place and has a function to provide a service to a request by an activity. The actor agent 291 also has a message function 293 to exchange a message with an activity and has a message processing part 295 for determining the content of the request and providing a service.

While each functional block shown in FIG. 4 to FIG. 6 has been described, these functional blocks are logical functional blocks and it is not meant that each of them is implemented by an independent hardware or software. They may be implemented by a consolidated or a shared hardware or software. Also, it is not meant that all the functional blocks shown in FIG. 4 to FIG. 6 are indispensable components of this invention. For example, the order list 265 is not an indispensable component because the current node control part 267 may directly control a current node and a moderator agent acquiring other Result may be specified in ANDJoin processing. Further a run code can be generated by placing a run code generation part on another machine to which a GUI plan definition data may be sent.

D. Object Configuration

D-1. Object Configuration of Mobile Agents

Figure 7:
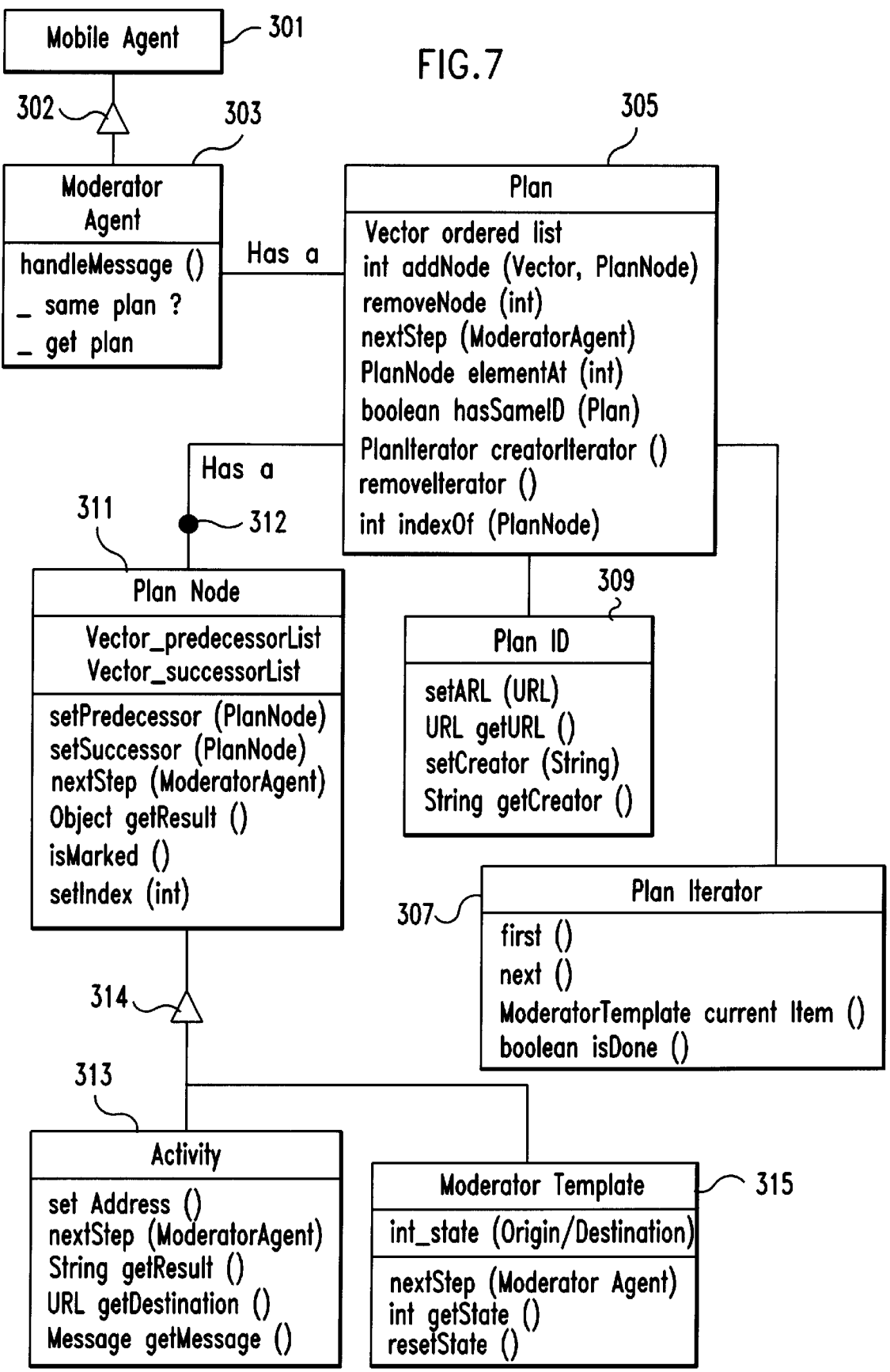
FIG. 7 is an object chart of the mobile agents generated in the preferred embodiment of this invention.
Figure 8:
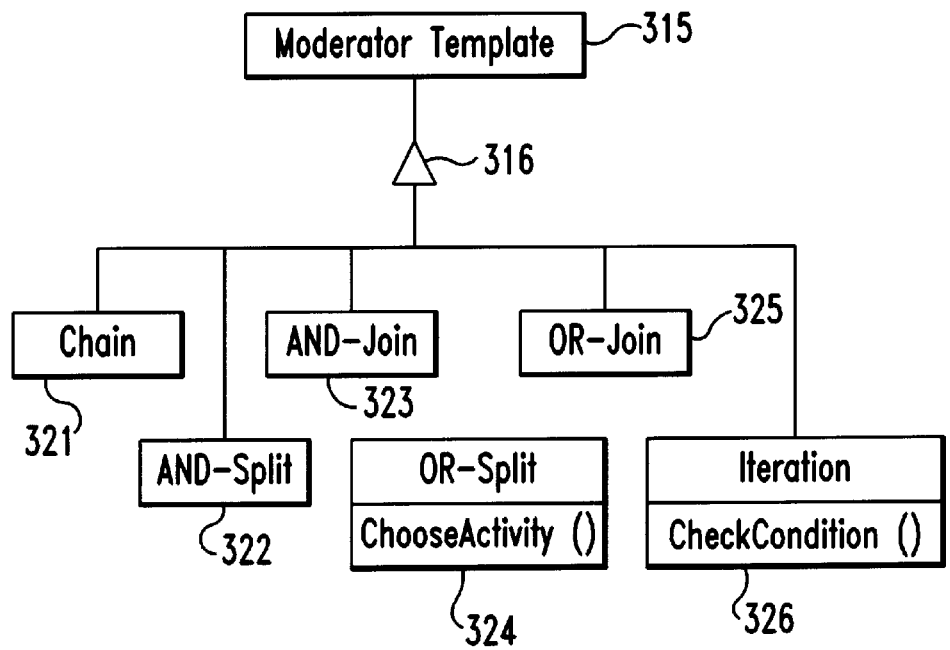
FIG. 8 is an object chart of the mobile agents generated in the preferred embodiment of this invention.

FIG. 7 and FIG. 8 are object diagrams of the mobile agents 270 of this invention. Each class of a moderator agent 303, a plan 305, a plan ID 309, and a plan iterator 307 has a method while each class of a plan node 311, an activity 313, a moderator template 315 and templates 321 to 326 (of FIG. 8) such as Chain, has data and a method.

In the figures, triangles 302, 314, 316 show inheritance of data and method from a higher class while a black circle 312 shows that a plurality of lower classes exist. A plan node is an abstract class and defines both a moderator template and an activity class by a common interface. The plan can thus treat both classes similarly during generation and execution of the plan.

A mobile agent 301 is a function (place class) currently provided in each place on the distributed computer environment and the user can easily create a mobile agent (moderator agent) by throwing an API-indicating creation of a mobile agent to this class. This is a function which is supported by the mobile agent of both Java and Telescript, described above in the description of prior art.

A plan node class has a list of both successors and predecessors and controls the relationship among a plurality of plan nodes. The class of plan node provides methods, "setPredecessor", "setSuccessor", and defines the relationship among the nodes. A concrete class of a plan node can discriminate the relationship among the methods.

The moderator template has state information to distinguish between an origin (place before movement) and a destination (place after movement) to join activities executed in different places. In the preferred embodiment of this invention, the moderator template can join only the activity objects. The moderator template is provided with a plurality of templates, including Chain, and allows provision of a basic mechanism for having a plurality of split moderator agents work on individual job allotted.

D-2. Object Configuration of GUI Plan Definition Data

Figure 9:
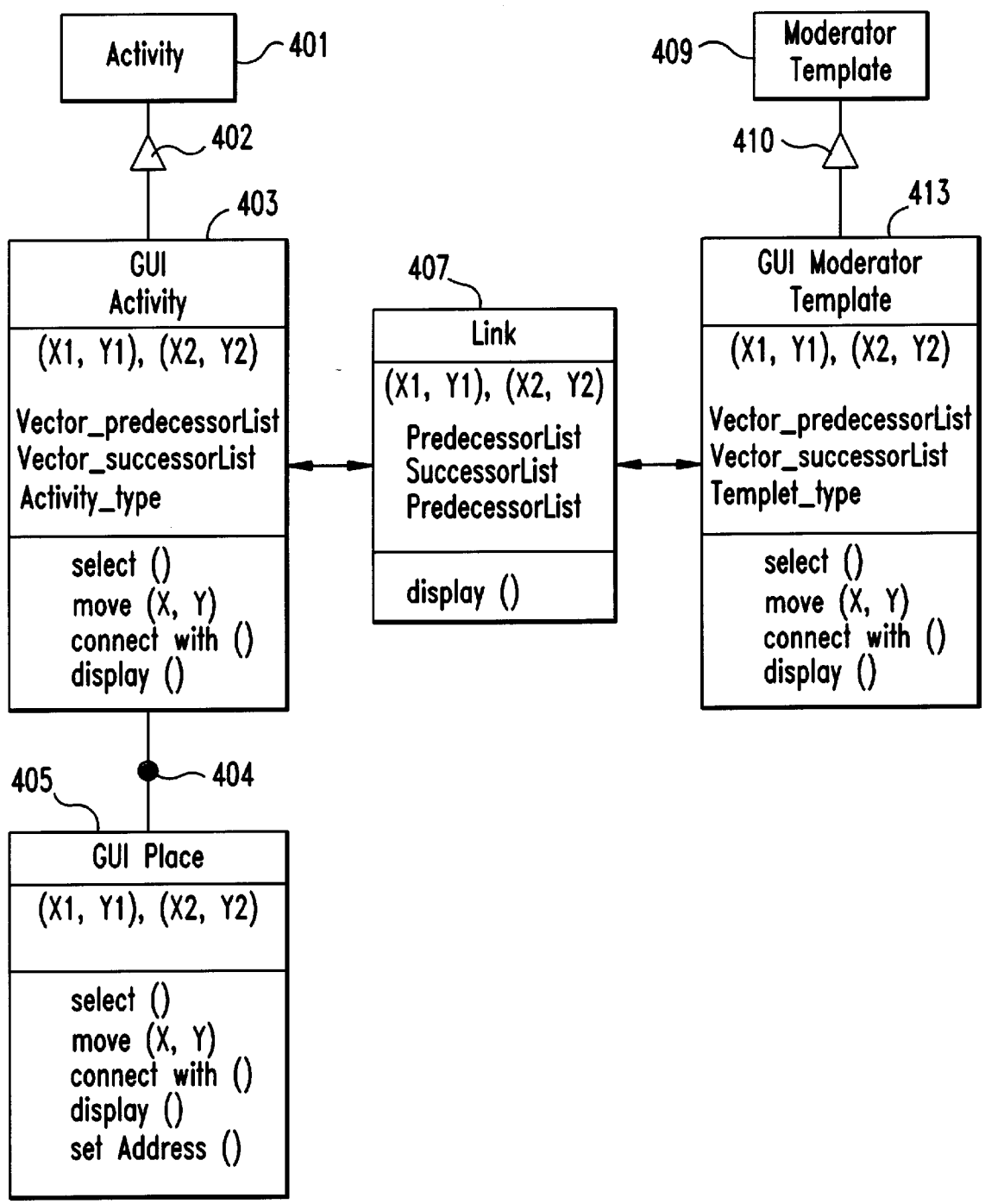
FIG. 9 is an object chart of the plan definition data generated in the preferred embodiment of this invention.

FIG. 9 is an object diagram of the GUI plan definition data 239 in the preferred embodiment of this invention. Each class of a GUI activity 403, a GUI moderator template 413, a GUI place 405 and a link 407 has data and a method. In this figure, triangles 402 and 410, show inheritance of data and method from a higher class while a black circle 404 shows that a plurality of lower classes exist.

The GUI activity 403 is an object to be displayed as an activity on the GUI builder and has data of a successor list and a predecessor list specifying an object which links to coordinate values (display start position: X1,Y1 and display ending position:X2,Y2) when displayed on the display.

Similarly, the GUI moderator template 409 is an object to be displayed as a moderator template on the GUI builder and has data of a successor list and a predecessor list specifying an object which links to coordinate values (display start position: X1,Y1 and display ending position:X2,Y2) when displayed on the display.

It also has data of a template type for specifying the kinds of moderator template.

The link object is an object for displaying a linking relationship between the GUI activity 403 and the GUI moderator template 409 and has data of a successor list and a predecessor list specifying an object which links to coordinate values (display start position: X1,Y1 and display ending position:X2,Y2) when displayed on the display.

The GUI place 405 is an object for displaying a place where each activity is executed and has data of coordinate value information (display start position of each GUI activity: X1,Y1 and display ending position:X2,Y2) of a GUI activity to be displayed inclusively and address information of the place.

D-3. Message Flow of Mobile Agents

Figure 10:
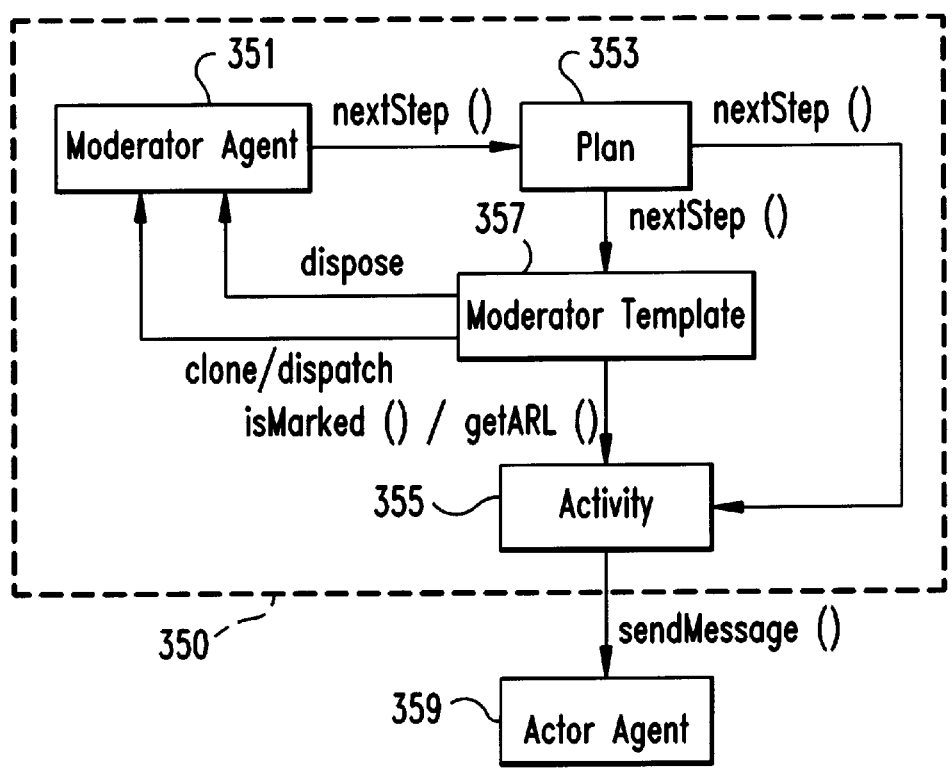
FIG. 10 is a diagram showing the flow of a message between objects in the preferred embodiment of this invention.

FIG. 10 is a diagram showing a major message flow of the classes in the preferred embodiment of this invention. The moderator agent 351 sends nextStep (an instruction indicating to execute the next step) to the plan 353 which in turn, in response thereto, sends out nextStep to the plan node object (moderator template 357 or activity 355). The activity 355 sends out sendMessage (request to send a message) to the actor agent 359 to execute a request specified by the user. The moderator template 357 sends getARL (an instruction to send an address) and isMarked (marking) to the activity 355 depending on the kinds or state. The moderator template 357 also sends out "clone" (request to prepare a duplication), dispatch (request to move) and "dispose" (request to extinguish) to the moderator agent 351.

E. Preparation of Plan Definition Data

Figure 11:
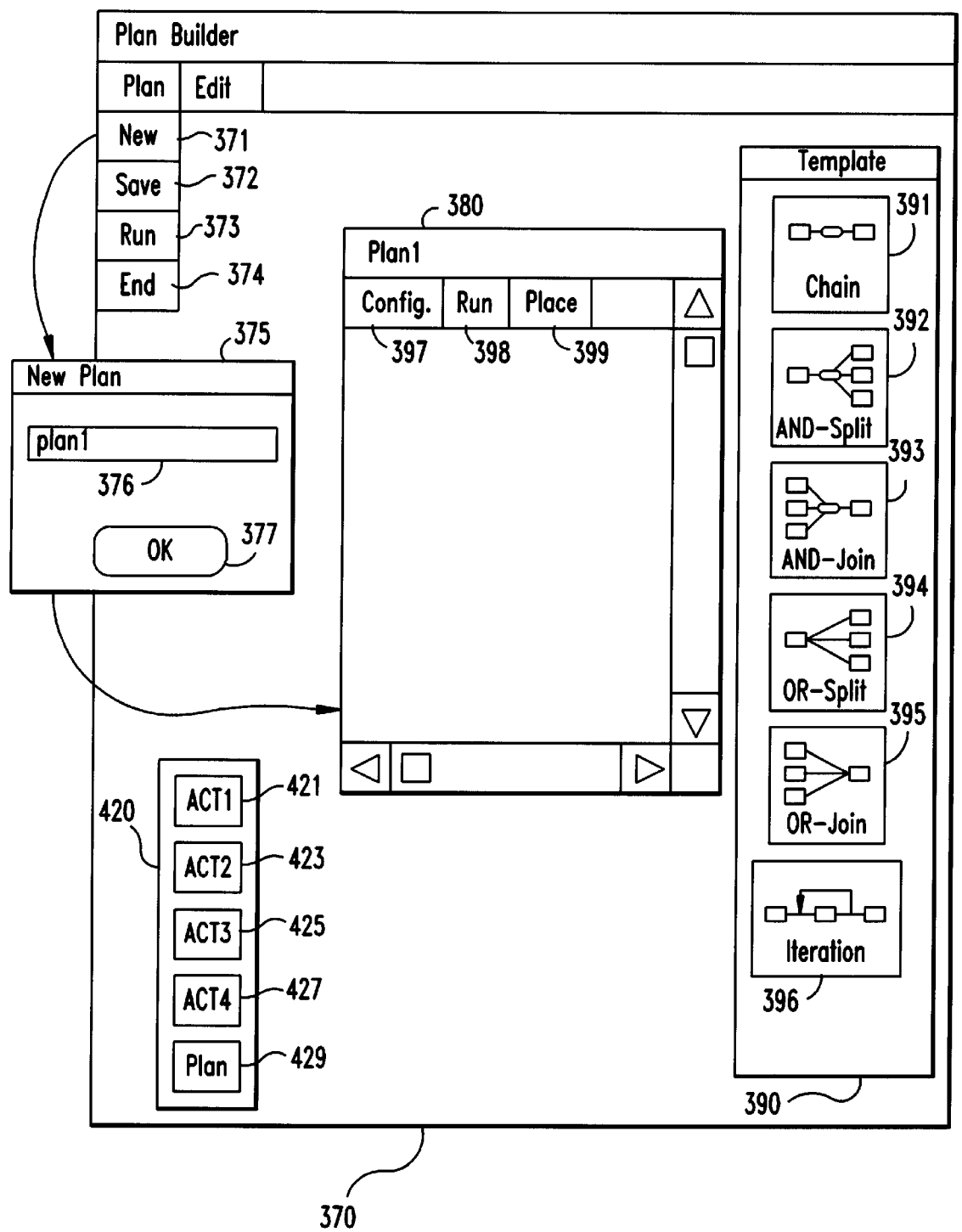
FIG. 11 is a diagram showing the user interface of the mobile agent generating system in the preferred embodiment of this invention.
Figure 12:
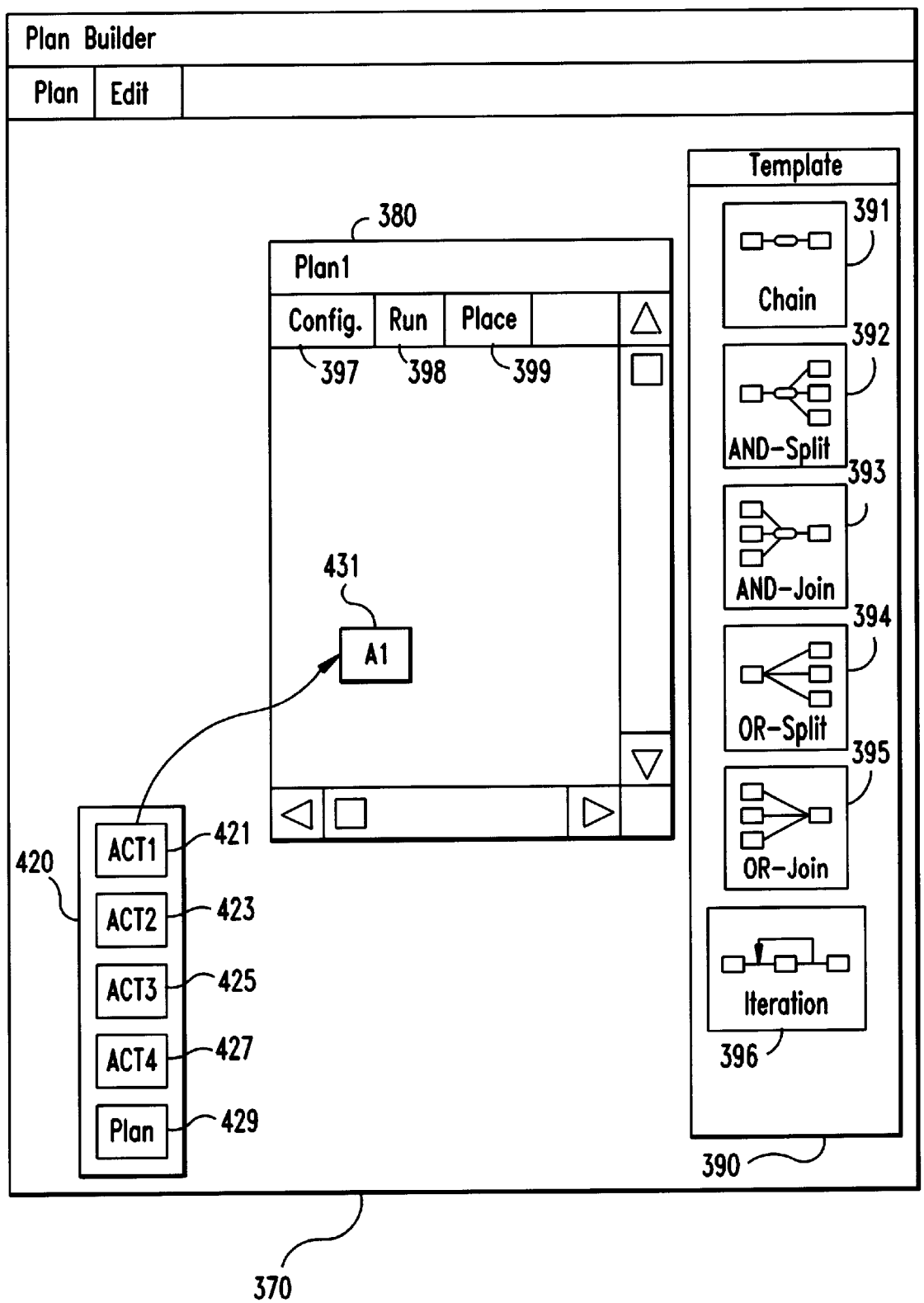
FIG. 12 is a diagram showing the user interface of the mobile agent generating system in the preferred embodiment of this invention.
Figure 13:
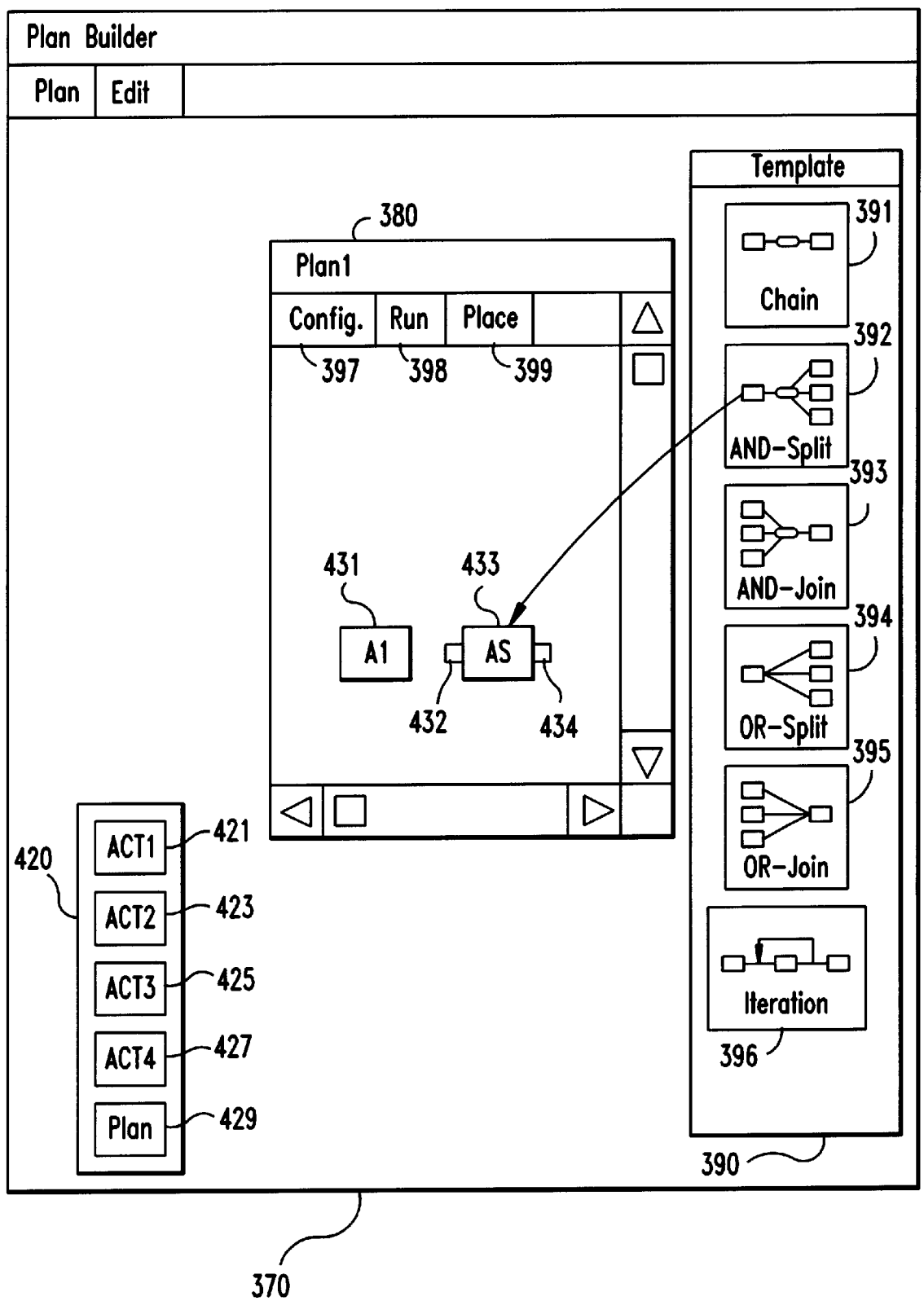
FIG. 13 is a diagram showing the user interface of the mobile agent generating system in the preferred embodiment of this invention.

This invention provides a development supporting tool which allows a user to simply generate the mobile agent. FIG. 11 to FIG. 13 show a user interface of the development supporting tool in the preferred embodiment of this invention. The user can simply generate coding of the above plan definition part by using the development supporting tool.

At first, when the user selects New 371, for new Plan, from the pull down menu and clicks with a pointing device, the plan object operating part 233 displays a dialog box 375 for input of a plan name. The user can thus provide the plan with a name which is different from the plan ID and familiar to the user. The user next inputs the plan name to an input entry 376 of the plan name and depresses an OK button to open a window 380 for defining a plan. The dialog box 375 for inputting the plan name may be displayed when the "Save" 372 of the pull down menu or the "End" 374 is selected as well.

Once the window 380 is opened, the user drags an activity icon (ACT1) 421 of the activity box 420 and drops it in the window 380 for defining a plan with a pointing device. Objects of a GUI activity 403 and a GUI place 405 are then generated based on prototype data of the GUI plan node library 201. The Display method of the generated GUI activity 403 is called upon and displayed, as 431, in the plan defining window 380 as a GUI activity as shown in FIG. 12. "0" is set in the predecessor list and the successor list of the GUI activity indicating "no object to be linked".

The GUI activity 403 (as displayed as 431) has a Select method and a Move method as shown in FIG. 9 and is capable of executing processing corresponding to a select by a mouse pointer and modifying the display position by dragging a mouse. The user then drags ANDSplit icon 392 of the template box 390 and drops it in the plan defining window 380 with a pointing device. Objects of the GUI moderator template 409 and the link 407 (2 link objects are generated) shown in FIG. 9 are then generated based on the prototype of the GUI plan node library 201. The Display method of the generated GUI moderator template 413 and the Display method of the link object 407 are called upon and displayed in the plan defining window 380 as a GUI moderator template 433 and link objects 432, 434 as shown in FIG. 13.

At this time, information of the GUI moderator template 433 is set in the successor list of the link object 432 while information of the GUI moderator template 433 is set in the predecessor list of the link object 434. On the other hand, information specifying the link objects 432, 434 are set in the predecessor list and the successor list of the moderator template 433, respectively. The display positions of the link objects are set to a value calculated from the position information of the GUI moderator template 433.

The GUI moderator template, 413 displayed as 433, also has a Select method and a Move method as shown in FIG. 9 and is capable of executing processing corresponding to Select by a mouse pointer and modifying the display position by dragging a mouse. When the GUI moderator template 433 is moved, the display positions of objects specified by the predecessor list and the successor list of the GUI moderator template 433 and a series of objects linking those objects are updated depending on the amount of movement to re-draw the screen by the Display method.

Figure 14:
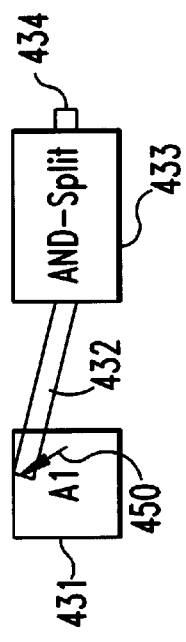
FIG. 14 is a diagram showing the user interface of the mobile agent generating system in the preferred embodiment of this invention.

Thereafter, when the user drags and drops the link object 432 onto the GUI activity 431 as shown in FIG. 14, the plan object operating part 233 specifies a linked GUI activity by comparing the display position of the GUI activity with the position of the mouse pointer now dragging, sets information specifying the link object 432 in the successor list of the GUI activity 431, and sets information specifying the GUI activity 431 in the predecessor list of the link object 432. The plan object operating part 233 also updates the display position of the link object 432 to a value corresponding to the display position of the GUI activity 431 to re-draw the screen by the Display method.

Figure 15:
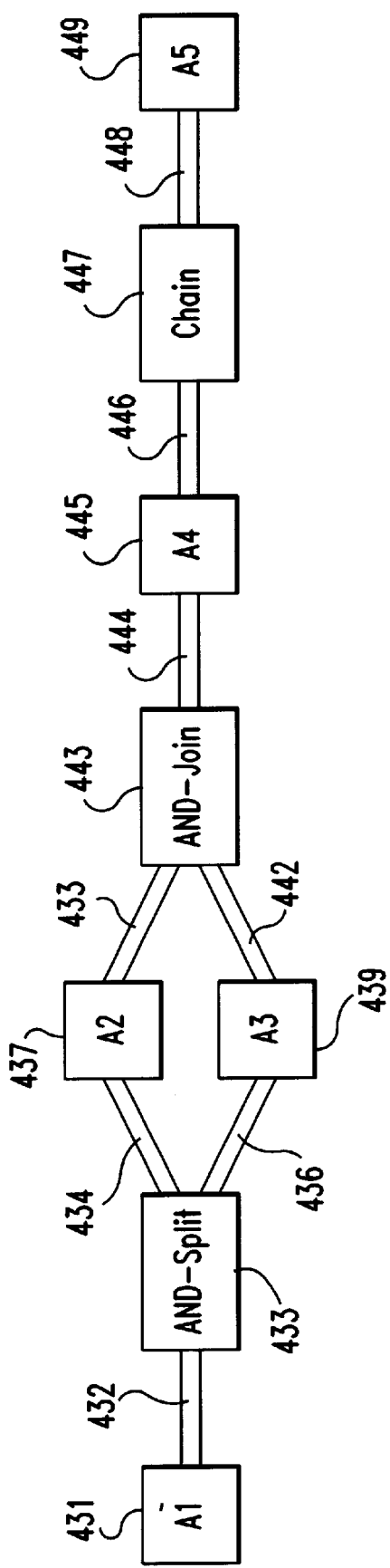
FIG. 15 is a diagram showing the user interface of the mobile agent generating system in the preferred embodiment of this invention.
Figure 16:
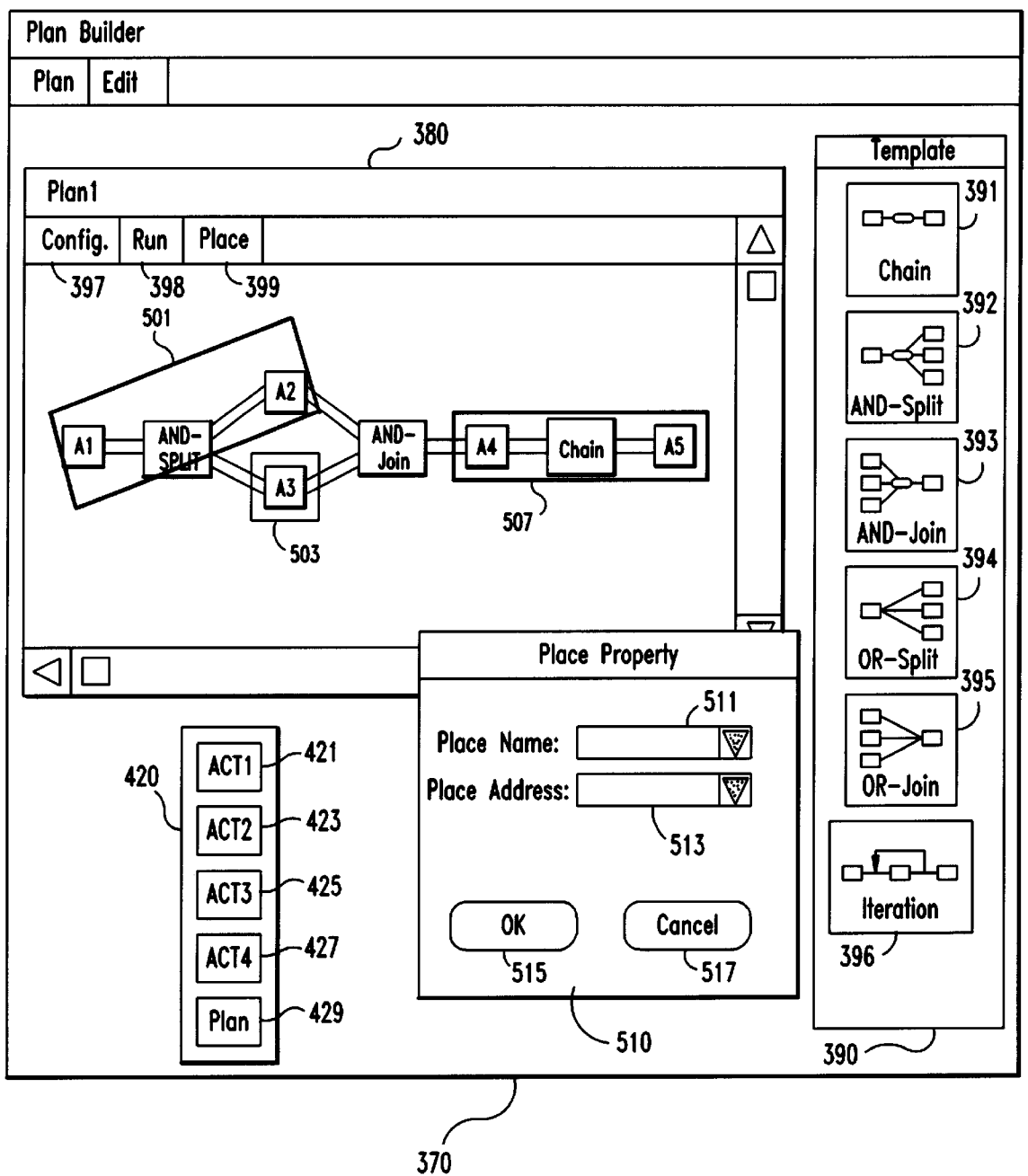
FIG. 16 is a diagram showing the user interface of the mobile agent generating system in the preferred embodiment of this invention.

In this manner, the user can dispose an activity of a desired execution order as shown in FIG. 15 in accordance with the nature and the procedure of a job done by a mobile agent. Thereafter, when the user selects a desired activity which the user desires to execute in the same place, while keeping the control key depressed, and clicks the icon 399 of the place, rectangles, 501 to 503 (of FIG. 16) including the selected activity, are displayed and a place property setting window 510 is displayed.

In the preferred embodiment of this invention, the rectangles 501 to 503 are obtained by ordering the center coordinates of the selected activities along x-coordinate direction and calculating rectangles of a given width having their centers lie on a line segment connecting the center coordinates of neighboring activities. Incidentally, ellipses having their focus lie on the center coordinate of the activities may be replaced with these rectangles.

When more than 2 activities are specified to be in a same place in the preferred embodiment of this invention, the overlapping portions of the rectangles are removed and displayed as a single polygon. Also, rectangles or polygons symbolizing the GUI places are preferably allocated with different color attributes so that the operator can distinguish between different places.

While an activity which is desired to be executed in a same place is selected by clicking the icon 399 of the place while depressing the control key of the keyboard, this can be also done by surrounding the activity which is desired to be executed in a same place by pointing and dragging a mouse, or canceling the selection by clicking after the selection. When the user sets a place name or a place address, they are set as an address and a place name of the GUI place 405 of the selected GUI activity 403 (FIG. 9)

F. Generation of Plan

Figure 17:
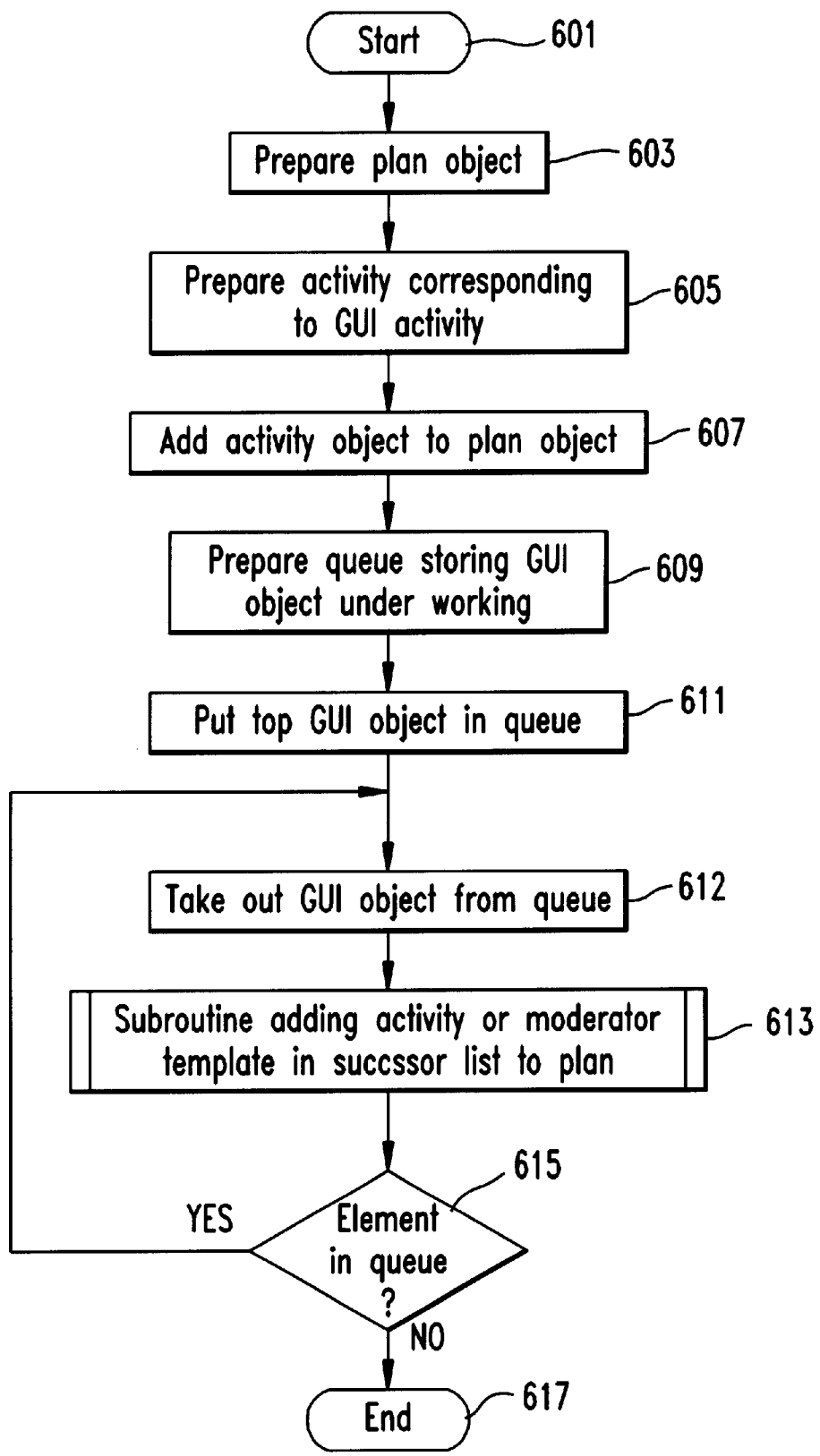
FIG. 17 is a flow chart showing a procedure for generating a run code (plan) based on plan definition data in the preferred embodiment of this invention.

FIG. 17 is a flow chart showing a procedure for generating a run code (plan) based on the plan definition data. First of all, a plan object is generated (block 603). Generation of a plan generally consists of a step of generating a plan ID and a step of establishing a link status with an object which is in a position lower than the plan object. In the preferred embodiment of this invention, the plan object is allocated with a plan ID which is unique on the global network. In the preferred embodiment of this invention, the plan ID generating part 215 (FIG. 4) generates a plan ID by composing a URL of the internet, a port number, an agent ID (allocated to the mobile agent generating part), and a serial number (allocated each time the mobile agent generating part generates a plan ID).

An example of the coding of the plan ID generating part is shown in Table 1. In the preferred embodiment of this invention, instructions of the plan ID generating part are provided to the user as a program part.

TABLE 1

```
public class Planner extends StationaryAgent{
    private Plan _plan;
    private PlannerFrame f;
    private URL _home;
    private AgletIdentifier _id;
    private int _planIndex = 0;
    public void onCreation(Object args){
        //generate a window for selecting a plan.
        f = new PlannerFrame("JMT -PlannerAgent", this);
        f.show ( );
        try{
        //acquire URL where the run code generating part
        exists
            _hpme = getAgletContext ( ).getHostingURL ( );
        //acquire ID of the mobile agent generating part
            _id = getIdentifier( );
        }catch(InvalidAgletException e){
            Utility.print(this, e.getMessage( ));
        }
    }
}
```

In the preferred embodiment of this invention, "New operator" for generating a plan object is provided as a function of Java and a new plan object is generated by executing this class using the plan ID as an argument. The moderator agent is generated by utilizing functions (place class) currently provided in the places as described in the above. In the preferred embodiment of this invention, the moderator agent is generated by throwing an API indicating generation of a mobile agent to the Aglets class of a mobile agent of Java base.

Next, an activity corresponding to the top GUI activity is generated (block 605). Specifically, a run time class name (A1 in this case) is acquired from the activity type of the GUI activity and then its instance is generated using the class name "A1" as a key. The generated activity is added to the plan object (block 607).

A FIFO (First In First Out) queue is generated for storing a GUI object under processing (GUI activity, GUI moderator template or link object) (block 609) and the top GUI object (GUI activity) is put in the queue (block 611). The top GUI object is determined by seeing whether or not the predecessor list is null, etc. Next, an element (GUI object) is taken out from the generated queue (block 612) to execute a subroutine (block 613), which adds an activity or a moderator template existing in the successor list shown in FIG. 18.

Figure 18:
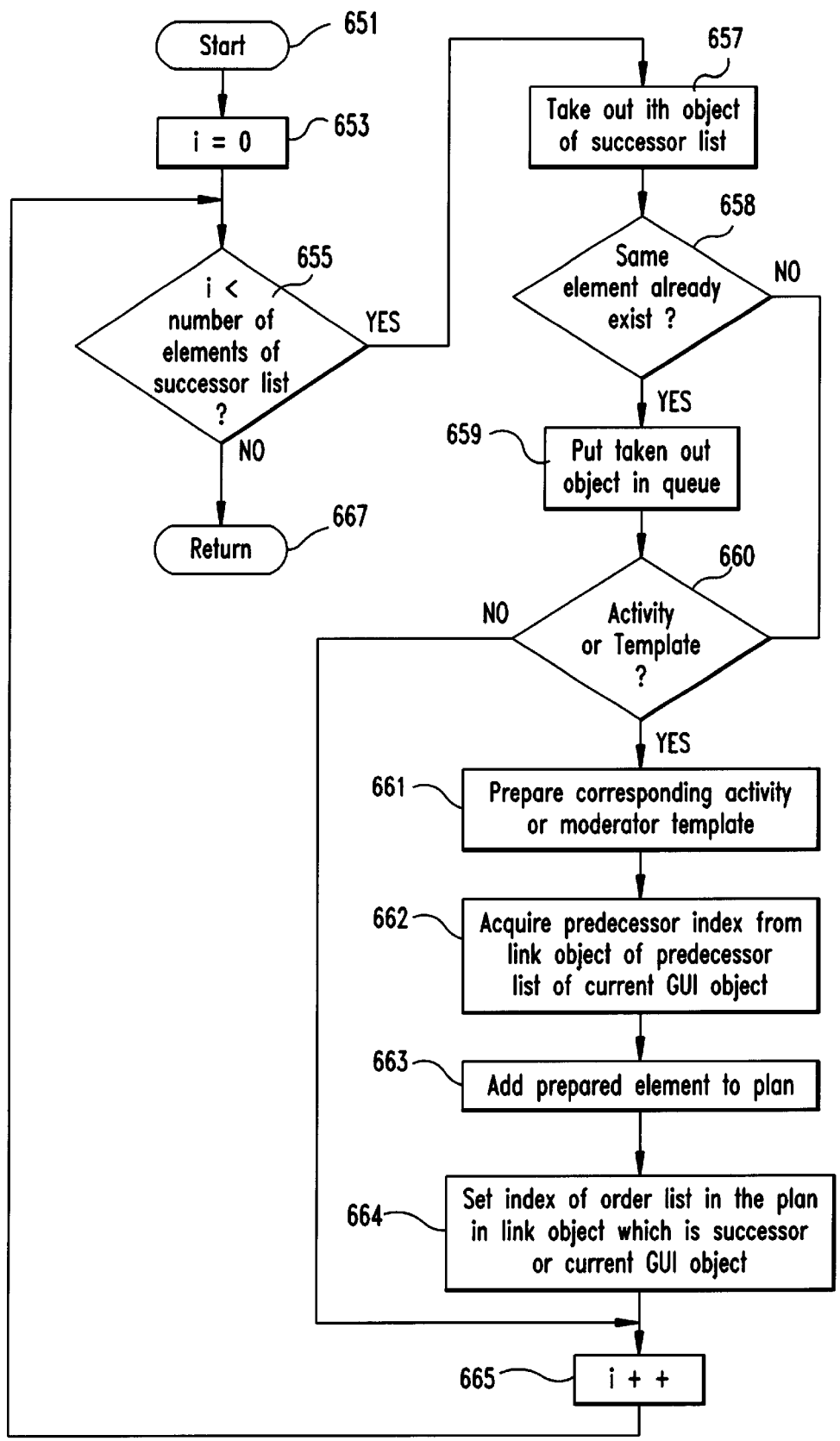
FIG. 18 is a flow chart showing a procedure for generating a run code (plan) based on plan definition data in the preferred embodiment of this invention.

FIG. 18 is a flow chart showing the processing procedure of this subroutine. First of all, the number of elements of the successor list is compared with the value i to determine whether or not this process is executed for all elements of the successor list (block 665). When the number of elements of the successor list is greater than i, the i-th GUI object of the successor list is taken out. (block 657). It is then determined whether or not the taken-out GUI object already exists in the queue (block 658); and, only the element which does not exist is put in the queue which was generated in block 609 of FIG. 17.

Next, it is determined whether or not the take-out element (GUI object) is a GUI activity or a GUI moderator template (block 660). If the taken out element is a GUI activity or a GUI moderator template, a corresponding activity or moderator template is generated (block 661). At this time, address information of the corresponding GUI place is acquired if it is a GUI activity.

A predecessor index is then acquired from the link object of the predecessor list of the current GUI object to set its own predecessor list. In a GUI activity or a GUI moderator template other than the top, the predecessor list never fails to contain information of a link object. Because null information is set in the predecessor list of the top GUI activity, a null is set in its own predecessor list.

The generated element (activity or moderator template) is then added to the plan and the index of the order list in the plan is set in the link object which is the successor of the current GUI object. The link object holds this value as a predecessor index which is used as information for forming a predecessor list of the activity or the moderator template. If the taken out-element is not a GUI activity or a GUI moderator template, a corresponding activity or moderator template is not generated and the next element is processed.

After the process of the block 657 to 665 is repeated the number of times equal to the number of the elements, as determined at 655, the flow returns back to FIG. 17 to determine whether or not an element exists in the queue and, if there exists an element, it is taken out (block 612) and a subroutine (block 613) to add an activity or a moderator template existing in the successor list shown in FIG. 18 is executed again.

G. Execution of Plan

G-1. The Case of Topology including Chain Template

Figure 19:
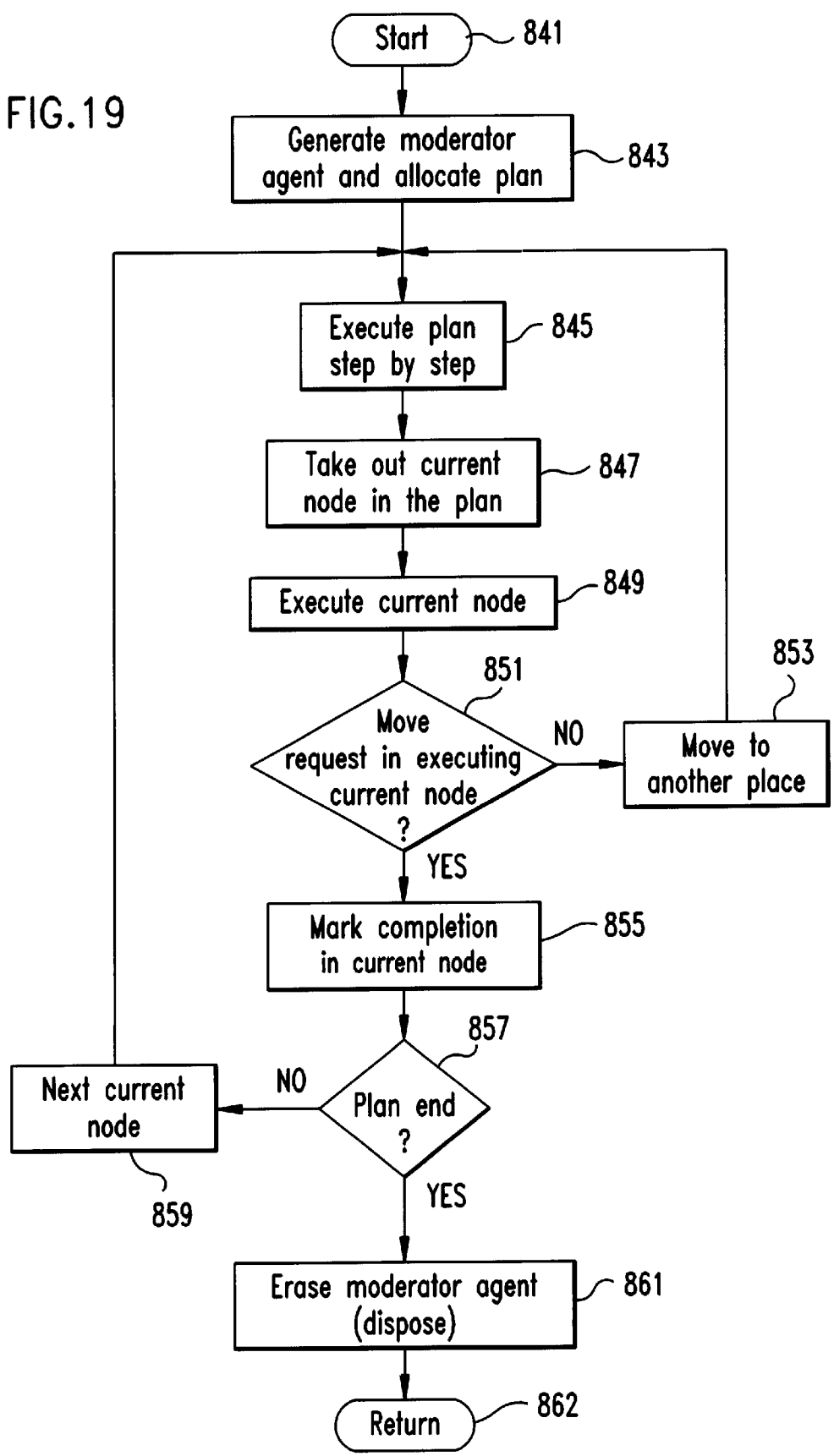
FIG. 19 is a flow chart showing a procedure for executing a plan object in the preferred embodiment of this invention.
Figure 20:
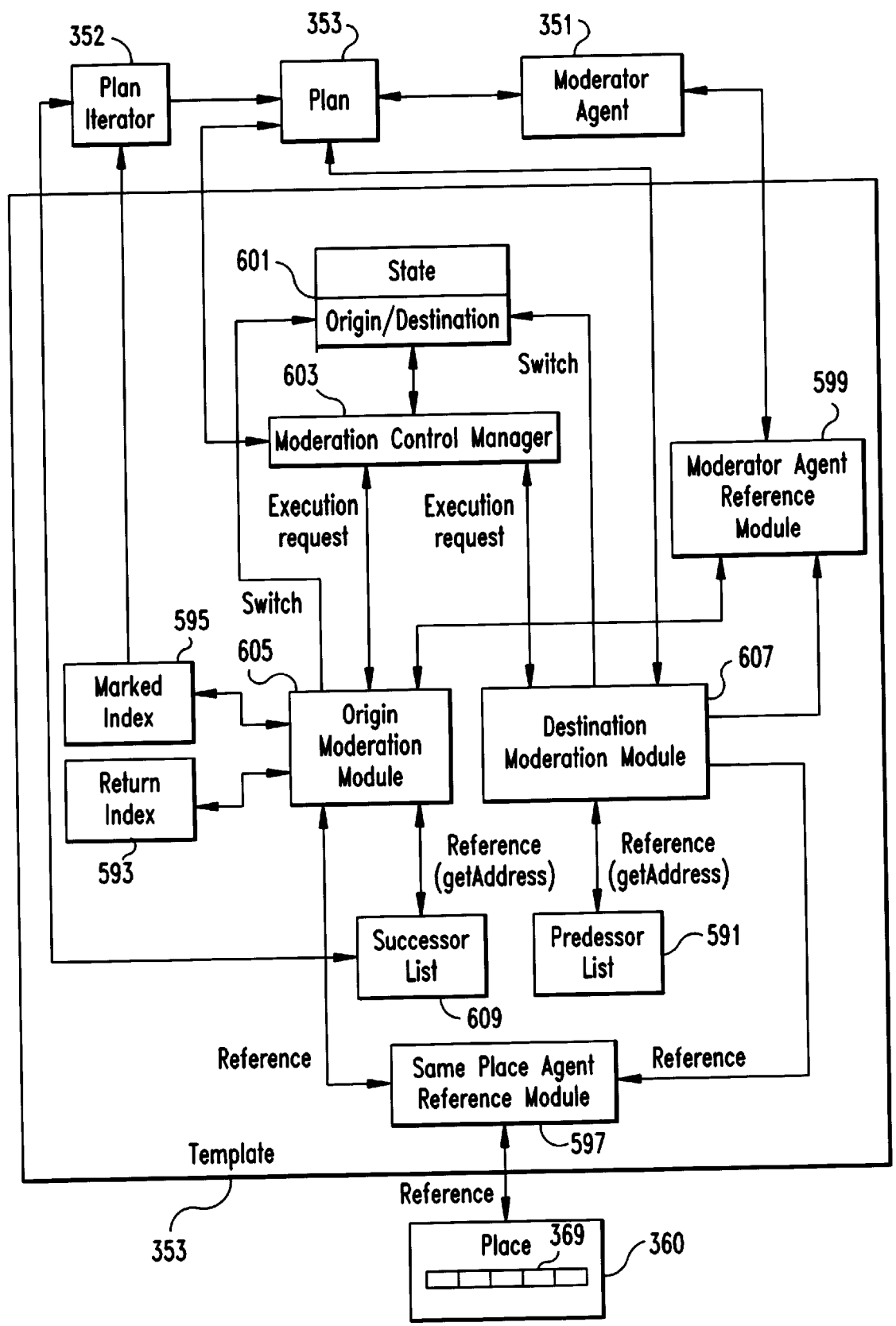
FIG. 20 is a functional block diagram of a moderator template in the preferred embodiment of this invention.

The operation of the mobile objects in the case of a topology which includes a Chain template is now explained with reference to FIG. 19 to FIG. 23. FIG. 19 is a flow chart showing the procedure for executing the plan while FIG. 20 is a functional block diagram of the moderator template. FIG. 23 schematically shows the state in which mobile objects move from a place of origin to a destination place. With reference to FIG. 19, first, when a moderator agent 351 is generated and allocated with a plan 351 (block 843), the moderator agent automatically executes the plan (block 845).

In response to "NextStep" instruction sent from the moderator agent 351 to the plan object 353, the plan object 353 takes out a current plan node (block 847). In the preferred embodiment of this invention, the plan iterator object 352 monitors in which step the current node is and provides information of which step the current node is (current) in response to an inquiry from the plan object 353.

Figure 21:
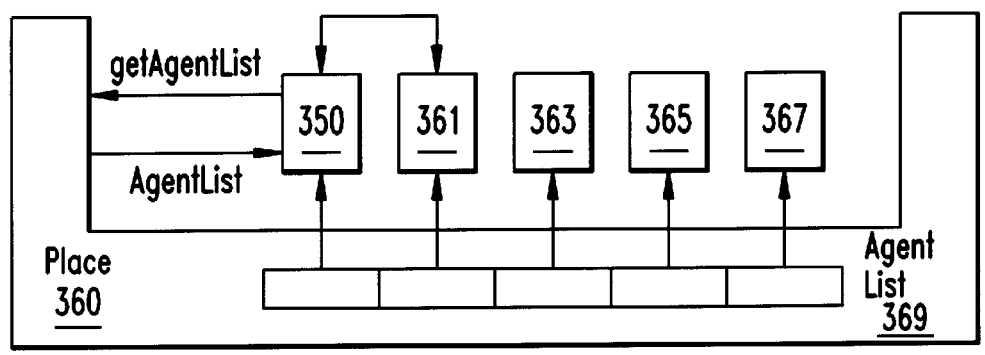
FIG. 21 is a schematic diagram of a place in the preferred embodiment of this invention.

When the plan iterator object 352 returns "0" (the first step) in response to the inquiry of the current, the plan object 353 takes out "act1" and then asks the "act1" to have the activity defined therein execute the request which is controlled by the activity (block 849). The activity determines whether or not the class name of an agent (agent name) held therein exists in the same place. As shown in FIG. 21, the moderator agent 350, upon arriving at the place 360, tells the place 360 its agent name which is controlled by the place 360 as an agent list 369. The agent existing in the place 360 can find an agent existing in the same place by issuing an instruction "getAgentList" to the place 360 for inquiry because the place has a function to return AgentList.

The activity sends a message (request) held therein to the agent (actor agent) 361 found. The actor agent 361 in turn sends an object of return to the requesting agent 350 in response to the request. The requesting agent stores the received object in the record 525 of Result. The activity notifies the plan object 353 that the requested job has completed and the plan object 353 marks act1 indicating that the process has completed (block 855). The plan object 353 then asks the plan iterator 352 to move the step forward (block 859) and the plan iterator 352 provides the plan object 353 with current information.

Because the current is "1" (the second step), the plan object takes out the object of Chain template (blocks 845, 847) and asks the Chain to execute (block 849). The moderation control manager 603 of the Chain inquires the state control part 601 of the current state. Because the state control part 601 is in the state of origin in default, it notifies the moderation control manager 603 that it is the origin. The moderation control manager 603, upon receiving information of the state from the state control part 601, asks the state control part 601 to switch the state. The state control part 601 switches the state from the origin to the destination in response to this.

Figure 22:
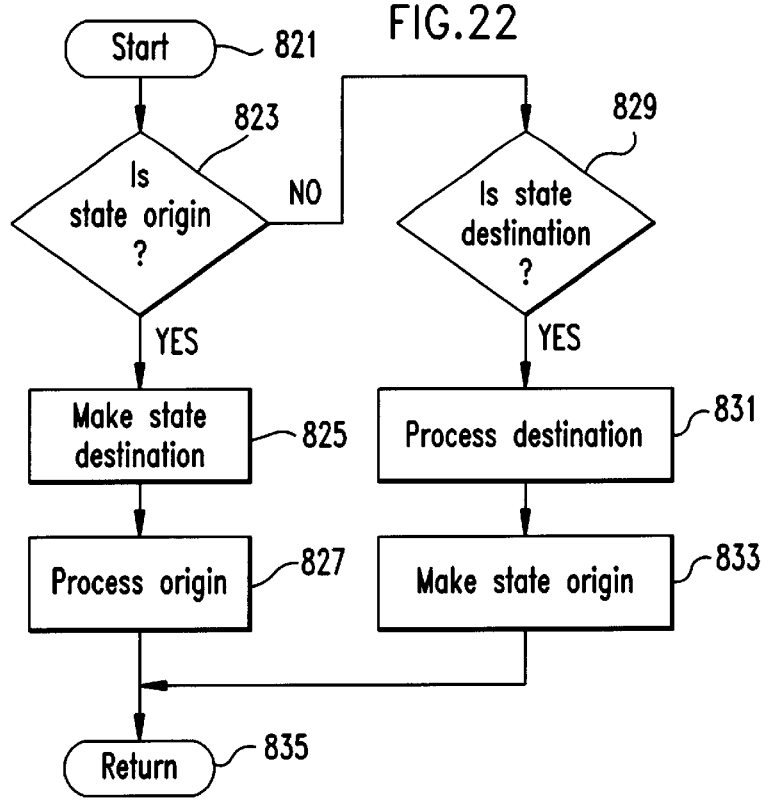
FIG. 22 is a flow chart showing a summary of processing the moderator template in the preferred embodiment of this invention.
Figure 23:
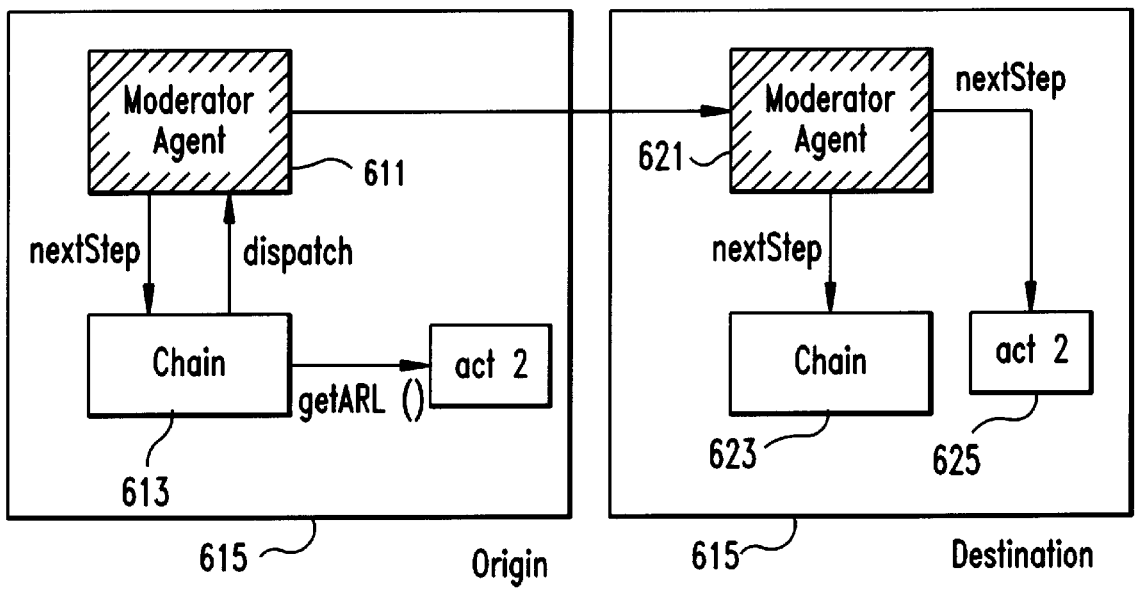
FIG. 23 is a schematic diagram showing the state in which mobile objects in the preferred embodiment of this invention move from an origin place to a destination place.

Switching of the state done by the template and the flow of the process in the origin or the destination are shown in FIG. 22. The flow chart shows an operation which is common to a plurality of templates though the content of processing in the origin in the block 825 and in the destination in the block 831 vary for different kinds of the templates.

The moderation control manager 603 asks the moderation module 605 for the origin to execute. A set of instructions for the template to operate in respective places are controlled in the moderation module for the origin 605 and the moderation module for the destination 607. The moderation module for the origin 605 acquires an address of the place where the moderator agent 351 exists currently by inquiring the moderator agent reference module 599.

The moderation module for the origin 605 also asks the successor list 609 to deliver the address of the activity registered therein. The successor list 609 acquires the address from a registered activity (act2) to deliver it to the moderation module for the origin 603.

The moderation module for the origin 603 compares the address of the activity with the address of the place where the current moderator agent exists and moves the moderator agent to the address of the activity if the addresses do not match. Specifically, the moderation module for the origin 605 sends out an instruction commanding movement via the moderator agent reference module. If the addresses match, the process ends.

The plan object operating part again asks the plan object to execute step 1 in the destination. Similarly, it takes out the plan node of the current. The plan object asks Chain to execute the next step. Chain affirms information of the state and processes the destination. The information of the state is restored to the state of the origin.

When the plan affirms the completion of processing the destination of Chain, it takes out the plan node of the next current (act2) and asks to execute the activity. The act2 acquires the result which the act1 internally holds.

In the preferred embodiment of this invention, the destination module 607 refers to the predecessor list 591 and sends out an instruction of "getResult" asking the Chain to send the result of the process. The Chain searches the Result which it holds in response thereto. However, because the Chain does not hold the Result, it goes to the object (act1) registered in the predecessor list 591 to take the Result and returns that Result to the act2 with further reference to the predecessor list 591. When there is no object registered in the predecessor list 591, a Dummy is sent to the act2 indicating that the Result is not held. Alternatively, this may be done by preparing a record which stores the Result in the template.

The act2 obtains a reference to a report agent existing in the same place using the class name of the internally held agent as a key. The act2 sends to the report agent a message held internally with the result obtained from the act1 being an argument. The plan takes out the next current node. In this case, because a current node does not exist, the plan detects this and ends processing. The moderation module for the destination 607 sends out an instruction to extinguish the moderator agent to the moderator agent via the moderator agent reference module 599.

G-2. The Case of Topology including an Iteration Template

Figure 24:
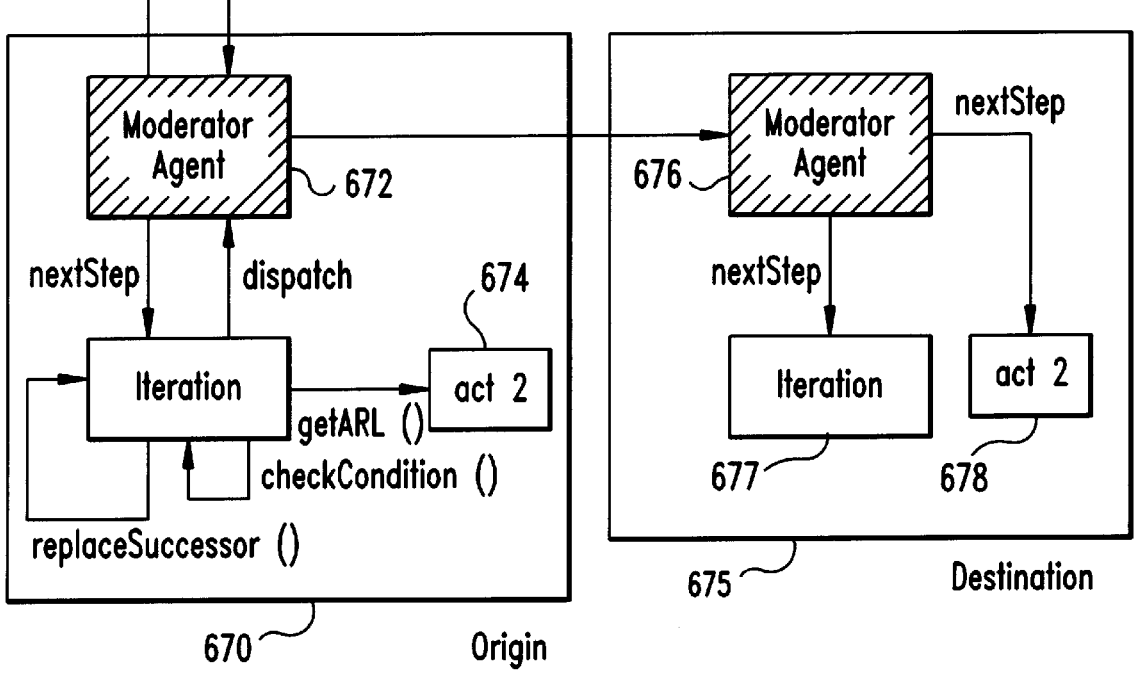
FIG. 24 is a schematic diagram showing the state in which mobile objects in the preferred embodiment of this invention move from an origin place to a destination place.

FIG. 24 is a diagram showing the summary of operation of the mobile objects which are controlled by the Iteration template. Processing in the case of a topology, including the Iteration template, is now explained with reference to FIG. 20. Similarly to the case of the Chain, a moderator agent 351 is generated, a plan object 353, which is then prepared as an argument, is delivered, and the plan 353 is executed step by step. The plan object 353 also takes out the plan node (Chain) of the current, similarly to the case of the Chain, while the Chain executes process in the origin. Also, the plan object 353 executes a process in the destination and the activity of the act1 as described in "G-1. The Case of Topology including Chain Template".

Figure 25:
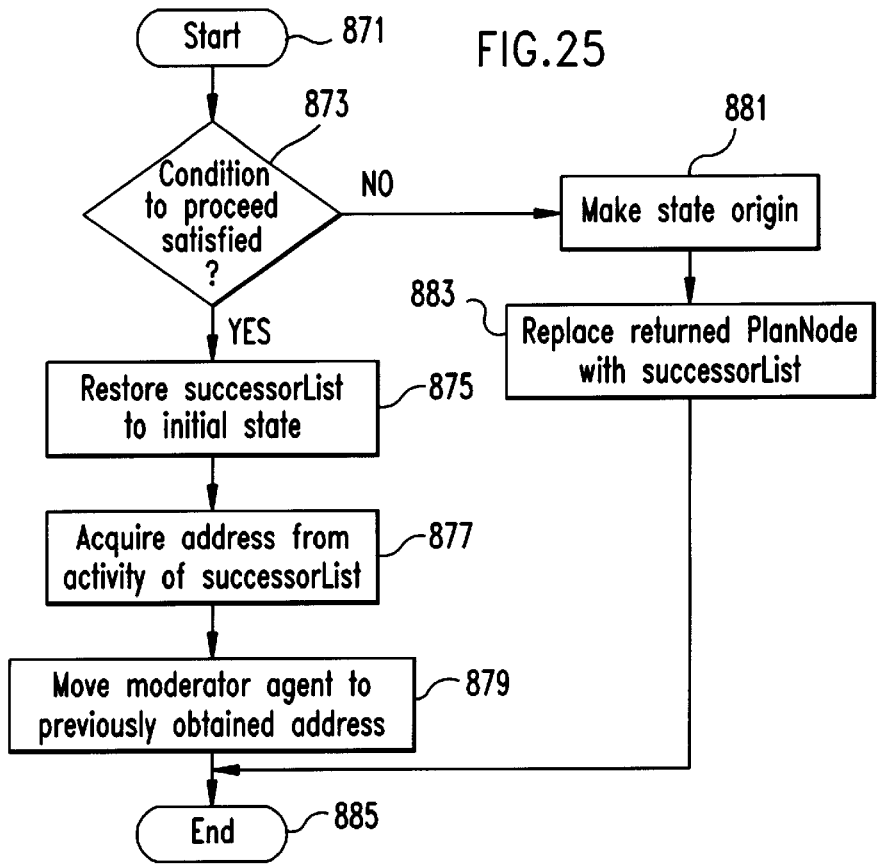
FIG. 25 is a flow chart showing a procedure for processing the Iteration template in the origin in the preferred embodiment of this invention.

When the act1 has been processed, the plan 353 then asks the Iteration to execute the next step. FIG. 25 is a flow chart showing the procedure of a process in the origin of the Iteration template. In the process in the origin of the Iteration template, it is determined whether or not the next step may be processed, e.g., whether or not the information of the result of the act1 matches a predetermined condition (block 873).

If the condition is met, a successor information internally held is stored in the successor list (block 875). An address is taken out from the act2 of the successor list (block 877) and the moderator agent is moved to that address (block 879). When the condition is not met, the state is set to origin (block 881), a reference of the plan node is obtained from the return node index, the element of the successor list is replaced in that plan node and the flow proceeds to the next step (block 883). Subsequently, the act2 is processed and the process is completed as described in "G-1. The Case of Topology including Chain Template".

G-3. The Case of Topology including ANDSplit and AND-Join Templates

Figure 26:
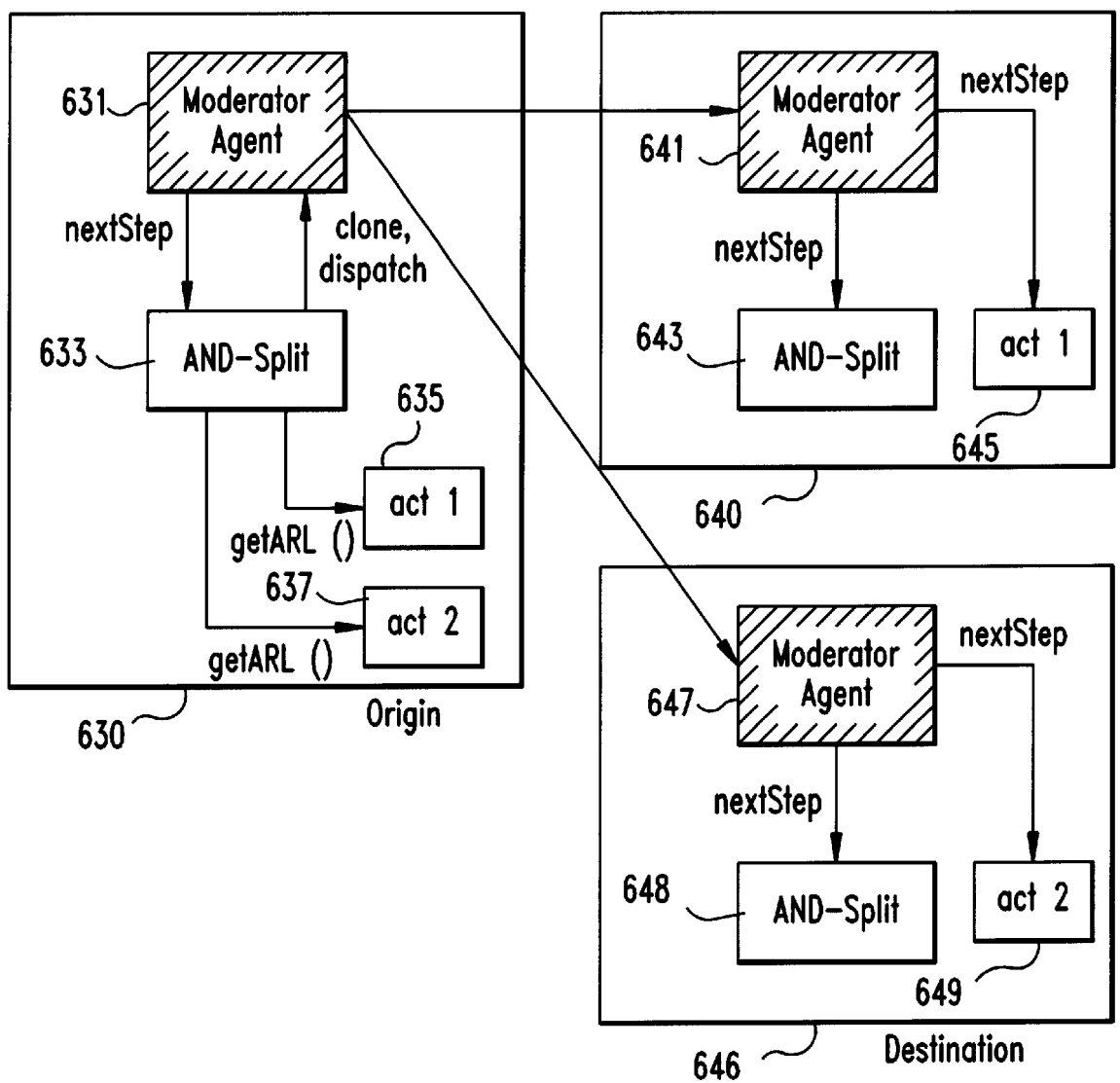
FIG. 26 is a schematic diagram showing the state in which a mobile object in the preferred embodiment of this invention moves from an origin place to a destination place.
Figure 27:
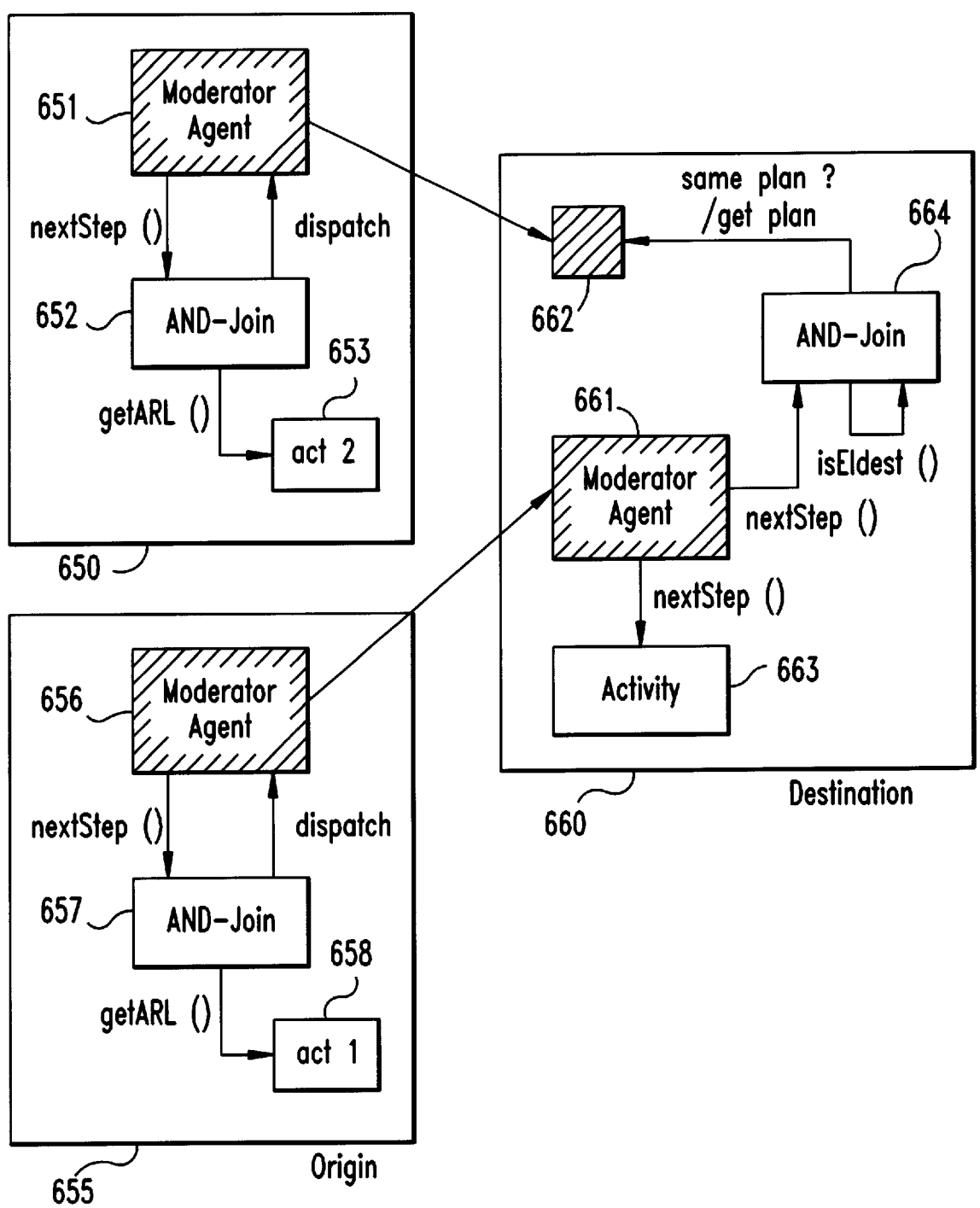
FIG. 27 is a schematic diagram showing the state in which mobile objects in the preferred embodiment of this invention move from an origin place to a destination place.

FIG. 26 and FIG. 27 are diagrams showing a summary of operation of mobile objects which are controlled by the ANDSplit and ANDJoin templates. The case of a topology including the ANDSplit and ANDJoin templates is described hereunder with reference to FIG. 20. Similarly to the case of Chain, the moderator agent 351 is generated, a prepared plan object 353 is delivered as an argument, and the plan 353 is executed step by step.

Figure 28:
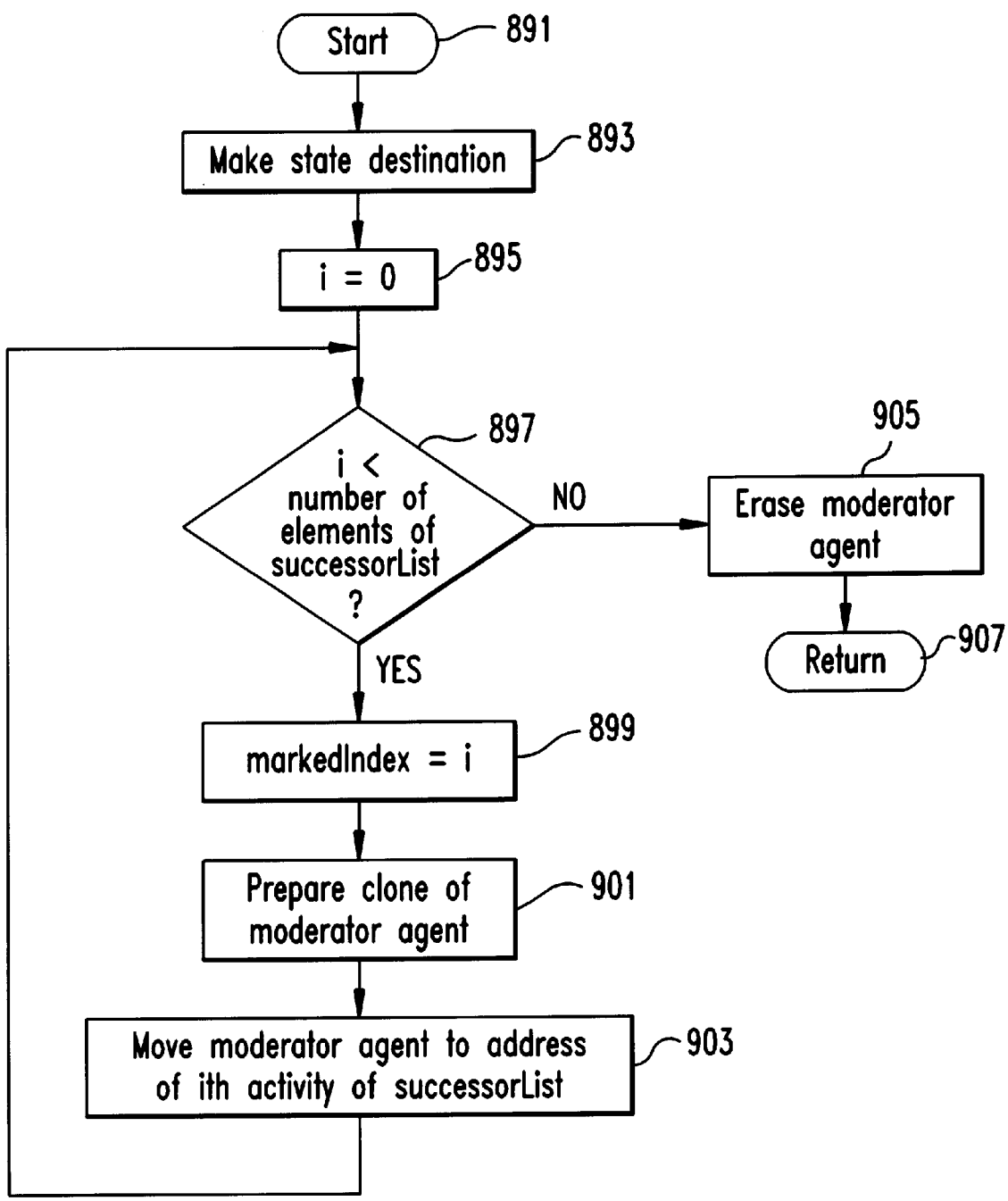
FIG. 28 is a flow chart showing a procedure for processing the ANDSplit template in the origin in the preferred embodiment of this invention.

The plan object 353 takes out ANDSplit which is a plan node of current in the manner similar to the case of Chain. The plan 353 asks the ANDSplit to execute the next step. FIG. 28 is a flow chart showing a procedure of processing the origin in the ANDSplit template.

The moderation control manager 603 searches state information of the state control part 601 and acquires information of "origin" which is a default. The moderation control manager 603 asks the moderation module for the origin 605 to process in the origin. The moderation control manager 603 asks the state control part to change the state to destination (block 893). The ANDSplit takes out the first activity of the successor list with reference to the successor list (block 897) and sets "0" in the marked index 595 (block 899).

The moderation control manager 603 then asks the moderator agent 351 to prepare a clone of the moderator agent via the moderator agent reference module 599 (block 901).

The moderator agent, responding to this request, also prepares copies of all objects including the moderator agent, a plan, a template and an activity held by the moderator agent.

The moderator agent of a clone prepared by a copy tells its own agent ID to the moderator agent reference module 599 in response to completion of preparation of the clone. The moderator agent reference module 599 notifies the moderator module for the origin 605 that preparation of the clone is completed.

The moderator module for the origin 605, responding to this, acquires the address of the activity (act1) corresponding to Value (0) of the marked index from the successor list 609. The moderator module for the origin 605 asks the moderator agent 351 to move the clone to the place corresponding to the address of the act1 via the moderator agent reference module 599 (block 903).

The moderator module for the origin 605 determines whether or not the next activity is registered with reference to the successor list 609. If it is registered, the moderator module for the origin 605 prepares another clone by a similar procedure and moves it to the place of the act2 (blocks 897–903). At this time, the marked index 595 of the clone moved to the act2 remains in "1" contrary to the clone moving to the act1 (block 899).

When preparation and movement of the clone moving to the act2 have been processed, the moderator module for the origin 605 determines whether or not the next activity is registered with reference to the successor list 609 (block 897). Because there is no registered activity in the successor list 609 in this example, the moderator module for the origin 605 recognizes that preparation and movement of the clone have been processed.

The moderator module for the origin 605, responding to this, sends out an instruction to erase the moderator agent remaining in the original place (place of origin) to the moderator agent 351 via the moderator agent reference module 599 (block 905).

Figure 29:
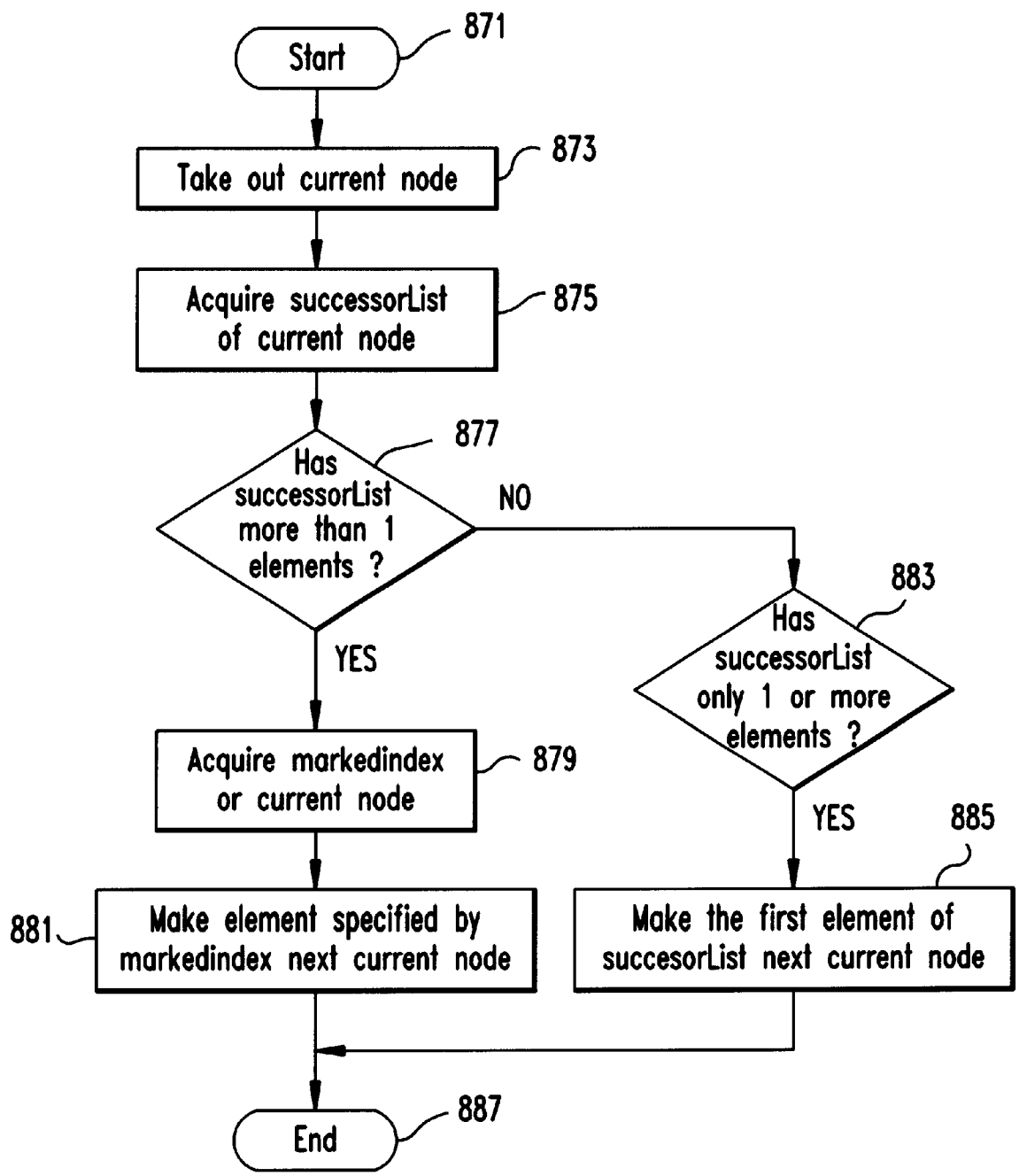
FIG. 29 is a flow chart showing a logic to decide a current node in the preferred embodiment of this invention.

On the other hand, the moderator agent of the clone executes the next plan step in respective places. At this time, ANDSplit is taken out again as a current node. A flow chart of a logic deciding the next current is shown in FIG. 29. The moderation control manager 603 acquires state information with reference to the state control part 601, recognizing that the current state is destination, and asks the moderation module for the destination 607 to execute the process.

The moderation control manager 603 restores the information of the state to the state of the origin. When the plan affirms completion of processing the destination of the ANDSplit, it takes out a plan node corresponding to the marked index (act1 or act2) and asks execution of the activity. The plan object 353 takes out the node of the next current with reference to the plan iterator 352. At this time, the plan iterator examines the registered value with reference to the successor list 609 and the marked index 595 (FIG. 29).

The act1 and the act2 acquire the Result which is held by the activity previously executed. In this example, because no activity was executed in advance to the ANDSplit template, the act1 and the act2 will not eventually obtain the Result held by the previously executed activity.

At first, ANDJoin is selected as a next current node in the agent of a clone corresponding to the act1. The plan object 353 asks the moderator control manager 603 of the ANDJoin template to execute the next step. The moderator control manager 603 recognizes that the current origin should be processed from the information of the state control part 601 and issues an execution request to the moderation module for the origin 605. It also asks the state control part 601 to change the state.

The moderation module for the origin 605 acquires address information of the activity (act3) which is registered in the successor list 609 with reference to the successor list 609 and instructs the moderator agent 351 to move to the place corresponding to the acquired address information via the moderator agent reference module 599.

The agent of the clone corresponding to the act2 also processes in a manner similar to the case of the act1 and moves to the place of the act3. Because the two moderator agents arrived at a new place, they execute the next steps, respectively. The plan object 353 takes out ANDJoin template as a current node and executes the next step.

Figure 30:
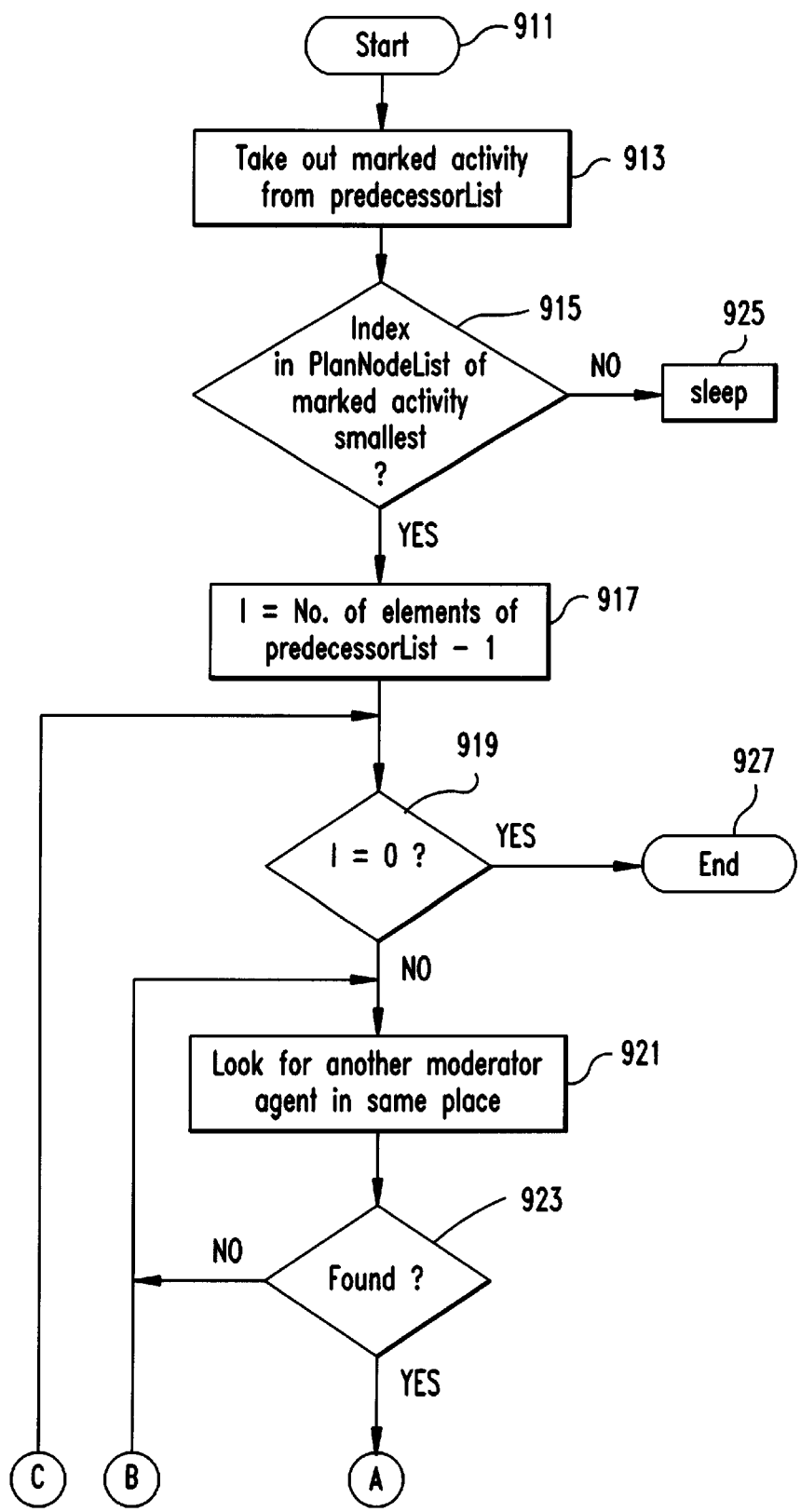
FIG. 30 is a flow chart showing a procedure for processing the ANDJoin template in the destination in the preferred embodiment of this invention.

FIG. 30 and FIG. 31 are flow charts showing a procedure of processing in the destination of the ANDJoin template. The moderation control manager 603 of the ANDJoin determines that the current state is the destination with reference to the state control part 601 and asks the moderation module for the destination 607 to execute. Each moderation control manager 603 restores the state to the state of origin. The moderation module for the destination 607 of the clone corresponding to the act1 takes out the activity marked with completion (act1 in this case) with reference to the predecessor list 591 (block 913). It is determined whether or not the taken out activity has the least index in the predecessor index list (block 915) and, if it is determined that it has the least index, receives the Result of other clone agents.

Specifically, the moderation module for the destination 607 asks a same place agent reference module 597 to acquire an agent list existing in the same place. The same place agent reference module 597, responding to this, issues an instruction "getAgentList" to the place 360 for inquiry. The place returns AgentList to acquire the list of agents existing in the same place. The same place agent reference module 597 delivers the list to the moderation module for the destination 607. The moderation module for the destination 607 looks for an agent which has the same plan ID from the list (block 921).

When an agent which has the same plan ID is found, the plan of that agent is acquired. The current node of the acquired plan is then examined (block 929) and the Result of that agent is received if it is the same ANDJoin. In the preferred embodiment of this invention, it is further determined whether or not the current node index is same (blocks 931, 933) and enters a process of merging only if it is same. This is done for preventing the subject to be processed of the ANDJoin from failing to be recognized. The moderation module for the destination 607 finds how many predecessors exist with reference to the predecessor list and receives as many Results as the number of the predecessors.

Figure 32:
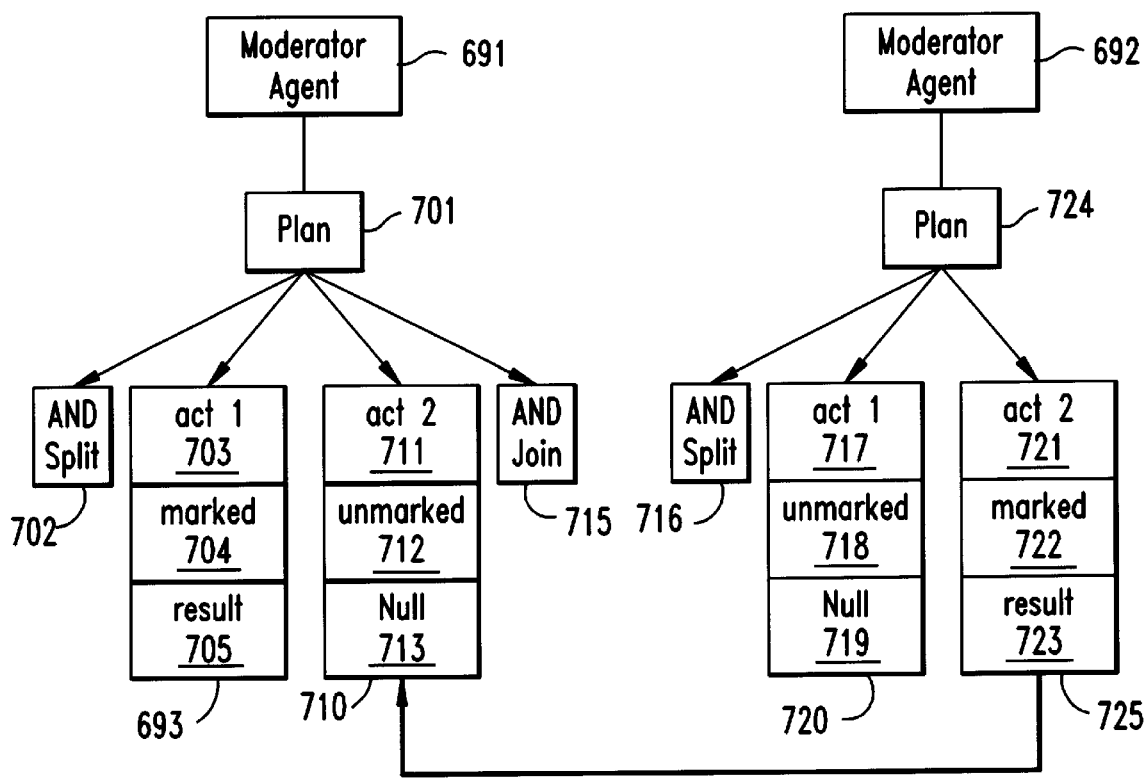
FIG. 32 is a diagram showing a summary of the process in which a mobile object in the preferred embodiment of this invention receives Result.

Specifically, the moderation module for the destination 607 takes out an activity marked completion with reference to the predecessor list 591 of the received plan and receives the Result held by that activity. The Result is set to the Result of the corresponding activity. The plan node itself may be replaced (block 935). FIG. 32 is a diagram showing a summary of the process of receiving the Result.

After the moderation module for the destination 607 detects completion of setting the Result, it issues an instruction to erase to the counterpart moderator agent 351 via the moderator agent reference module (block 937). The counterpart moderator agent, in receiving this instruction, erases the moderator agent and the objects it controls (plan, template and activity, etc.).

On the other hand, the agent corresponding to the act2 executes the next step upon arrival at the new place. The moderation module for the destination 607 of this agent also takes out the activity marked completion (act2 in this case) with reference to the predecessor list 591 (block 913). It is determined whether or not the taken out activity has the least index in the predecessor index list (block 915) and it is determined that it is not the least index. In this case, a Sleep state is entered to wait delivery of the Result of other clone agent (block 925).

Returning back to the clone corresponding to the act1, the moderation module for the destination 607 receives as many Results as the number of the predecessor lists (the number of elements of the predecessor list −1) and the plan takes out the next plan node (act3) and asks to execute the activity after completing erasure of the clone.

The act3 acquires the result which the act1 and the act2 internally hold. In the preferred embodiment of this invention, the moderation module for the destination 607 issues an instruction "getResult" to the act1 and the act2 (of the clone corresponding to the act1) asking to send the result of processing. The act1 and the act2, responding thereto, send out the Result which they hold. The act3 obtains a reference to an agent existing in the same place (a report agent in this example) using the class name of the internally held agent as a key. The act3 sends an internally held message to the report agent with the result obtained from the act1, act2 being an argument.

The plan takes out the next current node. Because the current node does not exist in this case, the plan detects this and ends processing. The moderator agent detects the end of processing and erases the moderator agent and objects which it controls, ending processing.

G-4. The Case of Topology including ORSplit Template

Figure 33:
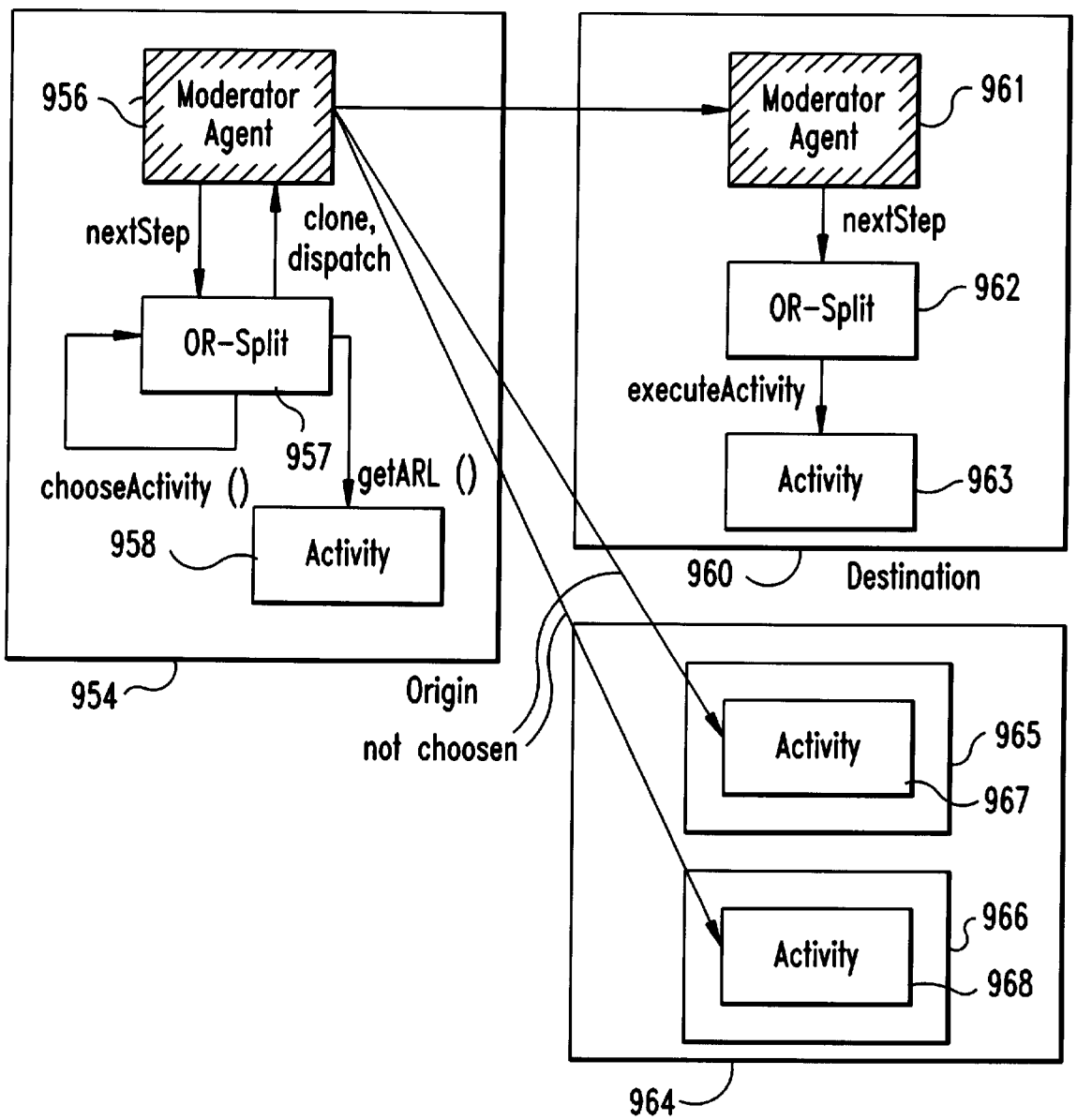
FIG. 33 is a schematic diagram showing the state in which the mobile objects move from the origin place to the destination place in the preferred embodiment of this invention.

FIG. 32 is a diagram showing a summary of operations of the mobile objects which are controlled by ORSplit template. In the case of ORSplit, the origin is processed as shown in FIG. 33, in contrast to the case of Chain and ANDSplit. The ORSplit template has one predecessor activity and a plurality of successor activities. In the original place, one activity is selected from the successor list by a method "chooseActivity" being called upon and only that selected activity is executed.

Figure 34:
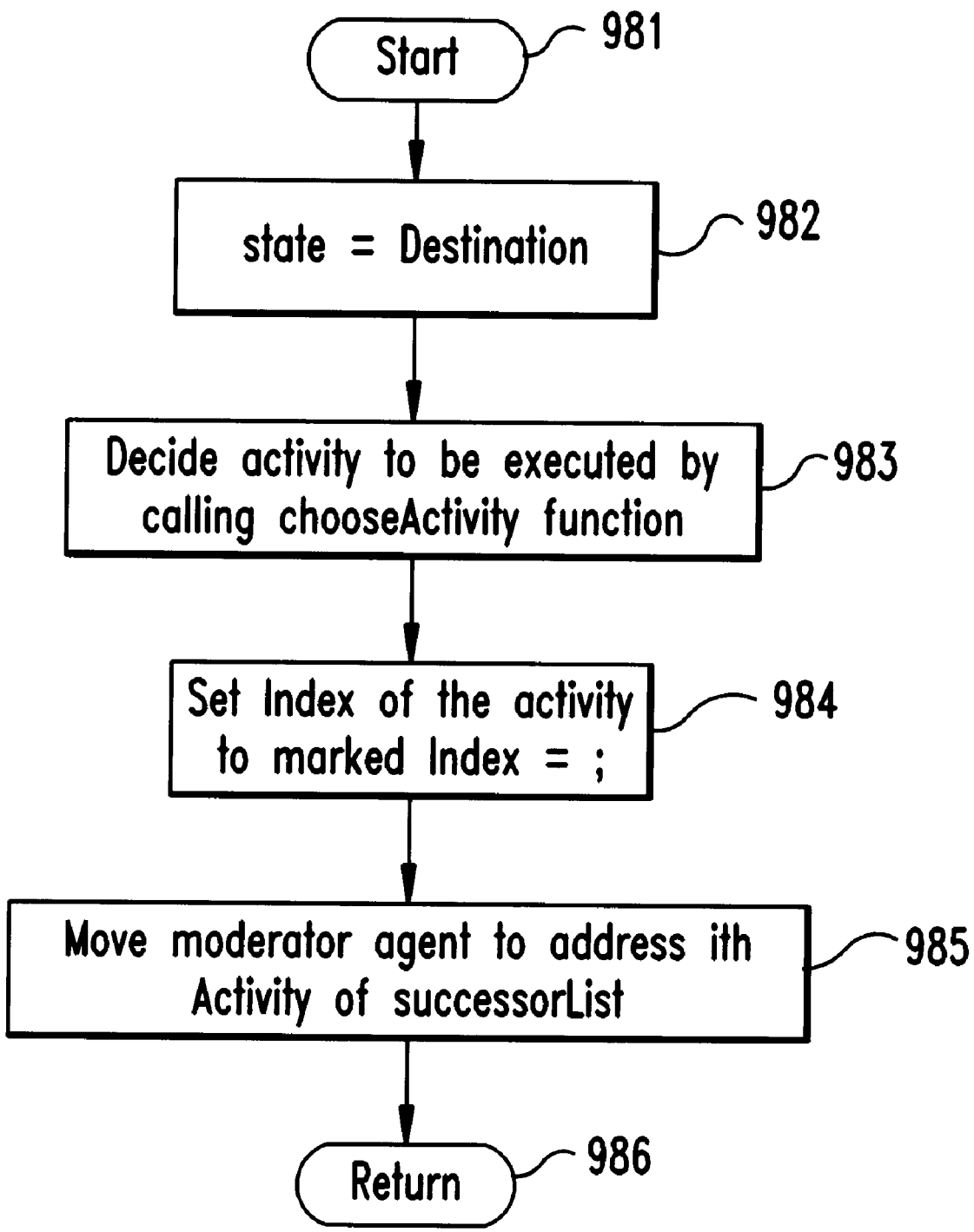
FIG. 34 is a flow chart showing a procedure for processing the ORSplit in the origin in the preferred embodiment of this invention.

In processing the origin of the ORSplit, the state is changed to the destination first of all (block 982 of FIG. 34). Function "chooseActivity" is then called upon and an activity to be executed which meets a predetermined condition is selected (block 983). The index of that activity becomes a marked index (block 984). The address of the selected activity is acquired and the moderator agent 351 is requested to move to that address (block 985).

G-5. The Case of Topology including ORJoin Template

Figure 35:
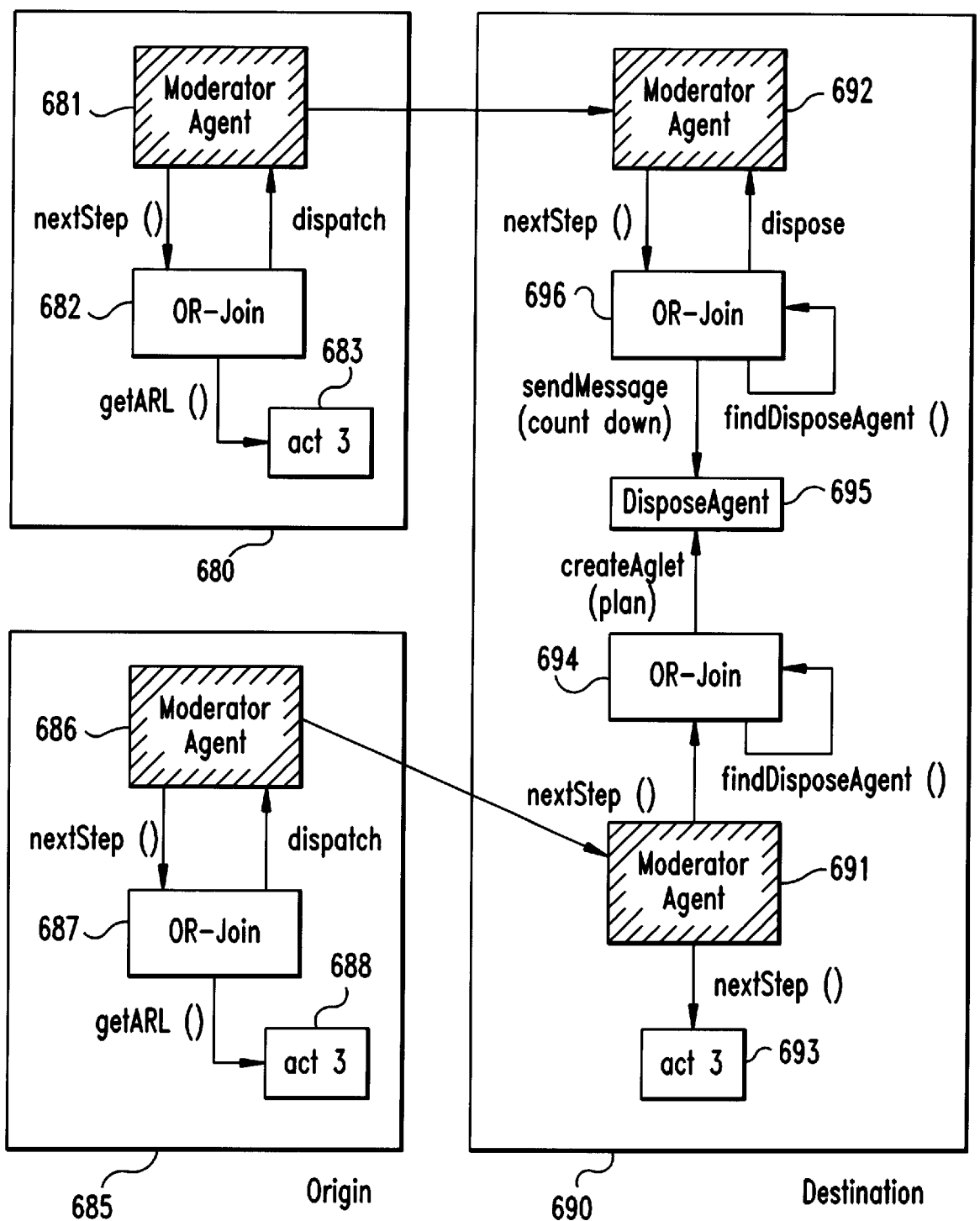
FIG. 35 is a schematic diagram showing the state in which the mobile objects move from the origin place to the destination place in the preferred embodiment of this invention.
Figure 36:
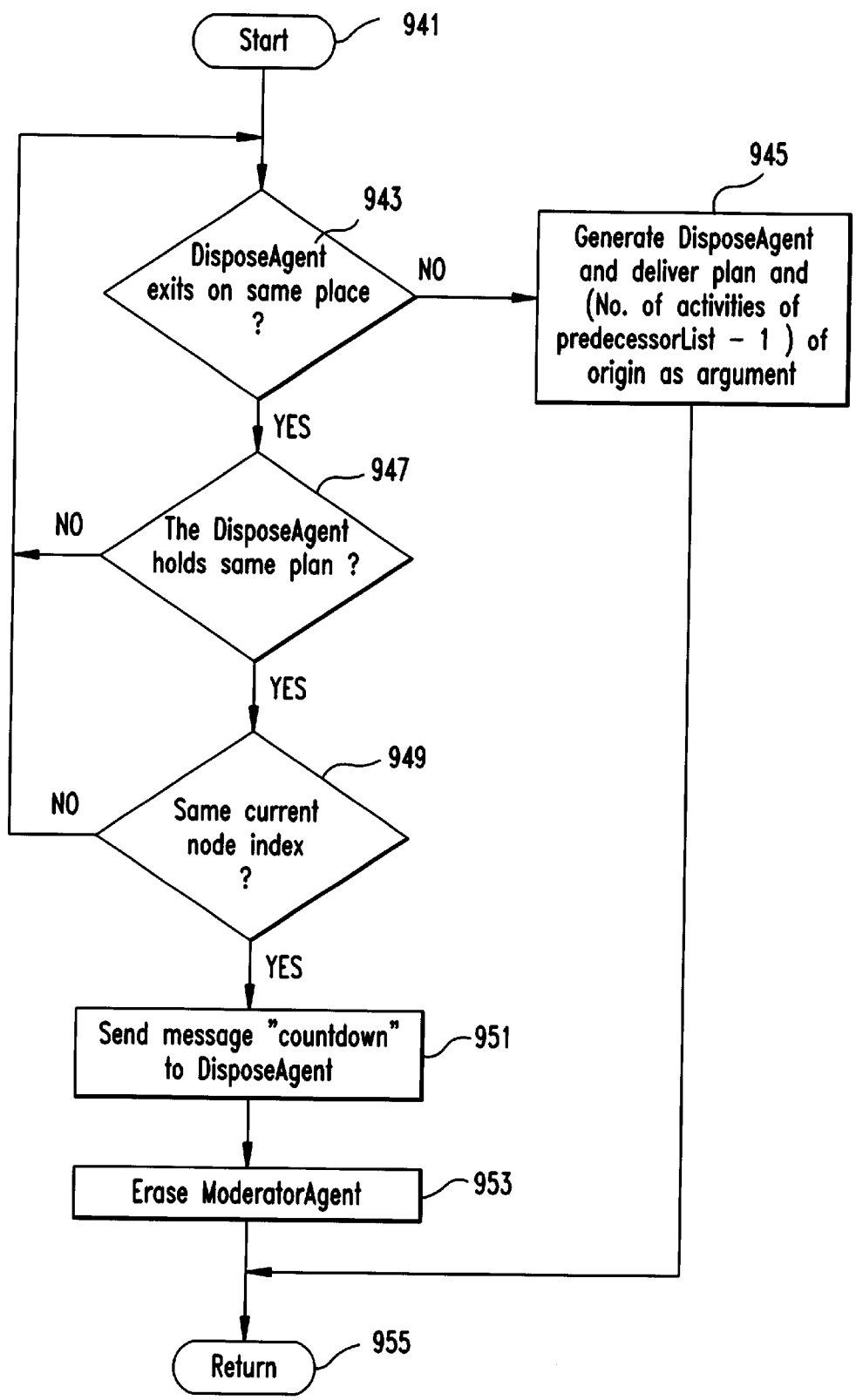
FIG. 36 is a flow chart showing a procedure for processing the ORJoin in the destination in the preferred embodiment of this invention.

FIG. 34 is a diagram showing a summary of operation of the mobile objects which are controlled by ORJoin template. In the case of ORJoin, the destination is processed as shown in FIG. 35 in contrast to the case of Chain and ANDJoin. The ORJoin template has a plurality of predecessor activities and one successor activity. In the destination, The ORJoin performs a process in which the mobile agent arriving first generates a Dispose agent while erasing other mobile agents.

The ORJoin template 694 of the mobile objects arriving first at the destination 690 sends out a method "findDisposeAgent" to determine whether or not a Dispose agent exists in the same place (block 943). If it does not exist, a Dispose agent which erases other agents is generated (block 945). The plan and the number of activities of the predecessor list −1 is delivered as an argument at this time. The Dispose agent waits for the mobile object of "the number of activities of the predecessor list −1" to erase that object and erases itself after it fulfilled its role. While the condition to survive depends on whether or not an object arrived first at the destination 690 in the preferred embodiment of this invention, the content of the Result may be the condition to continue to be processed.

On the other hand, the ORJoin templates 696 of other mobile objects similarly send out a method "findDisposeAgent" to determine whether or not a Dispose agent exists on the same place (block 943). Because a Dispose agent already exists in this case, a process of being erased by the Dispose agent is entered. Specifically, it is determined whether or not the Dispose agent holds a same plan (block 947) or a same current node index (block 949) to affirm that it is the Dispose agent to be erased.

When it is affirmed that the Dispose agent is one which should be erased, a message "countdown" is sent to the Dispose agent to decrease the number of processes of the Dispose agent (block 951). The ORJoin template 696 then sends a dispose request to the moderator agent 692 to extinguish it.

While the preferred embodiment of this invention also provides a part Join template which has a plurality of predecessor activities and a plurality of successor activities less than the predecessor activities, description of such template is omitted because such template may be implemented by a combination of the above described templates. For example, the part Join template may be implemented by a combination of a plurality of predecessor activities, an ORJoin template linking to one successor activity, an activity to determine that a desired number of ORJoin templates have been executed, an Iteration template returning to the ORJoin template depending on determination of whether or not the latter activity cleared a desired condition, a dummy activity and an ANDSplit splitting into a desired number.

As described in the above, this invention allows a mobile agent to be developed with a reduced amount of development labor and time of a programmer without requiring a high level programming knowledge. Also, the development labor and time required for developing a mobile agent can be reduced as far as possible. Further, this invention can provide a user friendly environment of developing a mobile agent which allows a developer to intuitively grasp the functions thereof. The invention has been described with reference to several specific embodiments. One having skill in the relevant art will recognize that modifications may be made without departing from the spirit and scope of the invention as claimed.

Having thus described our invention, what we claim as new and desire to secure by Letters Patent is:

1. A method for generating at least a part of mobile objects, which mobile objects are generated to execute different activities in different places in a computer network under the control of at least one mobile moderator agent, in a mobile agent generating apparatus which is provided with a pointing device and a display screen, said method comprising the steps of:

(a) generating a first GUI activity for display of a first mobile agent activity on said display;
   (b) generating a second GUI activity for display of a second activity on said display;
   (c) generating a GUI moderator template for display of a moderator template defining the connection relationship between said first activity and said second activity on said display;
   (d) receiving operator input and establishing first order information specifying the order of said GUI moderator template and said first GUI activity in response to said operator input for correlating said GUI moderator template to said first GUI activity;
   (e) receiving operator input and establishing second order information specifying the order of said GUI moderator template and said second GUI activity in response to said operator input for correlating said GUI moderator template to said second GUI activity;
   (f) displaying a first entry for inputting first address information of a first place where said first activity is run;
   (g) storing said first address information in correlation to said first GUI activity;
   (h) displaying a second entry for inputting a second address information of a second place where said second activity is run;
   (i) storing said second address information in correlation to said second GUI activity; and
   (j) generating at least a part of mobile objects from said first order information, said second order information, said first address information, and said second address information.

2. A mobile objects generating apparatus provided with a pointing device and a display screen is provided for generating at least a part of mobile objects, which mobile objects run different activities in different places in a computer network under the control of at least one mobile moderator agent, said apparatus comprising:

(a) GUI activity representing an activity and provided with a display method to display the activity on said display screen;
   (b) a GUI template representing an activity and a moderator template defining a connection relationship with at least one other activity and provided with a display method to display the template on said display screen;
   (c) an input event acquiring part for acquiring an operator input which correlates said GUI moderator template to said GUI activity;
   (d) a plan object operating part for specifying the order of said GUI moderator template and said GUI activity in response to said operator input;
   (e) a GUI place object provided with a display method for displaying an entry to input address information of a place where said activity is to run and a setAddress method for holding the address information of the place inputted in said entry; and
   (f) a run code generating part for generating at least a part of mobile objects based on said order information and the address information of said place.

3. A storage medium for storing GUI objects generating at least a part of mobile objects which run different activities in different places under the control of a mobile moderator agent in a mobile agent generating apparatus which is provided with a pointing device and a display screen, said medium storing:

(a) a GUI activity provided with a display method displaying an activity on said display screen in a manner in which it is recognized, and a predecessor list controlling the connection relationship with other GUI objects;
   (b) a GUI place object provided with a display method for displaying an entry to input address information specifying a place where said activity is to be run on said display screen, and a setAddress method for holding an inputted address information; and
   (c) a GUI moderator template provided with a display method for displaying a moderator template defining a connection relationship between an activity and other activities on said display screen in a manner they are recognized, and a GUI moderator template method for maintaining a predecessor list for controlling the connection relationship with other objects.

4. A storage medium for storing GUI objects generating at least a part of mobile objects which run different activities in different places under the control of a mobile moderator agent in a mobile agent generating apparatus which is provided with a pointing device and a display screen, said medium storing:

(a) a GUI activity provided with a display method displaying an activity on said display screen in a manner in which it is recognized and a predecessor list controlling the connection relationship with other GUI objects; and (b) a GUI place object provided with a display method for displaying, on said display screen, an entry to input address information specifying a place where said activity is to be run, and a GUI place object provided with a setAddress method for holding inputted address information.

5. A program storage device readable by machine, tangibly embodying a program of instructions executable by the machine to perform the steps of generating at least a part of mobile objects, which mobile objects are generated to execute different activities in different places in a computer network under the control of at least one mobile moderator agent, in a mobile agent generating apparatus which is provided with a pointing device and a display screen, said method comprising the steps of:

(a) generating a first GUI activity for display of a first mobile agent activity on said display;

(b) generating a second GUI activity for display of a second activity on said display;

(c) generating a GUI moderator template for display of a moderator template defining the connection relationship between said first activity and said second activity on said display;

(d) receiving operator input and establishing first order information specifying the order of said GUI moderator template and said first GUI activity in response to said operator input for correlating said GUI moderator template to said first GUI activity;

(e) receiving operator input and establishing second order information specifying the order of said GUI moderator template and said second GUI activity in response to said operator input for correlating said GUI moderator template to said second GUI activity;

(f) displaying a first entry for inputting first address information of a first place where said first activity is run;

(g) storing said first address information in correlation to said first GUI activity;

(h) displaying a second entry for inputting a second address information of a second place where said second activity is run;

(i) storing said second address information in correlation to said second GUI activity; and (j) generating at least a part of mobile objects from said first order information, said second order information, said first address information, and said second address information.

* * * * *